(12) United States Patent
Vodyanoy et al.

(10) Patent No.: US 7,564,623 B2
(45) Date of Patent: Jul. 21, 2009

(54) MICROSCOPE ILLUMINATION DEVICE AND ADAPTER THEREFOR

(75) Inventors: Vitaly J. Vodyanoy, Auburn, AL (US); Oleg M. Pustovyy, Auburn, AL (US)

(73) Assignee: Auburn University, Auburn, AL (US)

( * ) Notice: Subject to any disclaimer, the term of this patent is extended or adjusted under 35 U.S.C. 154(b) by 257 days.

(21) Appl. No.: 11/106,819

(22) Filed: Apr. 15, 2005

(65) Prior Publication Data
US 2005/0237605 A1      Oct. 27, 2005

Related U.S. Application Data

(60) Provisional application No. 60/563,175, filed on Apr. 16, 2004, provisional application No. 60/634,850, filed on Dec. 10, 2004, provisional application No. 60/650,607, filed on Feb. 7, 2005, provisional application No. 60/655,805, filed on Feb. 24, 2005, provisional application No. 60/660,484, filed on Mar. 10, 2005.

(51) Int. Cl.
*G02B 21/06* (2006.01)
*G02B 21/00* (2006.01)

(52) U.S. Cl. .................. 359/385; 359/368; 359/387

(58) Field of Classification Search ......... 359/368–390, 359/799
See application file for complete search history.

(56) References Cited

U.S. PATENT DOCUMENTS

| | | | |
|---|---|---|---|
| 1,951,636 A * | 3/1934 | Straubel | 359/799 |
| 1,996,920 A * | 4/1935 | Hauser | 359/381 |
| 2,674,157 A * | 4/1954 | Heine | 359/370 |
| 3,666,362 A | 5/1972 | Chance | 356/88 |
| 4,127,318 A | 11/1978 | Determann et al. | 359/382 |
| 4,246,488 A | 1/1981 | Hura | 250/513 |
| 4,317,613 A * | 3/1982 | Grosser | 359/370 |
| 4,687,304 A * | 8/1987 | Piller et al. | 359/387 |
| 4,737,022 A | 4/1988 | Faltermeier et al. | 359/387 |

(Continued)

FOREIGN PATENT DOCUMENTS

DE          31 00 662 A1 * 12/1981 .................. 359/386

(Continued)

OTHER PUBLICATIONS

"Phase-shifting polarization interferometry for microstructure linewidth measurement", M. Totzeck and H.J. Tiziani, Optics Letters/ vol. 24, No. 5/ Mar. 1, 1999.

(Continued)

*Primary Examiner*—Thong Nguyen
(74) *Attorney, Agent, or Firm*—Haverstock & Owens LLP

(57) ABSTRACT

An illumination system for a microscope, including a light source for generating light to illuminate a sample for microscopic observation, at least one collimating lens for collimating light generated by the light source, and a darkfield condenser for receiving collimated light and directing a hollow cone of light onto the sample under observation. The system optionally includes an adapter for enhancing economy of light transmission from the light source to the specimen, the adapter having a centrally disposed spacer and a plurality of optical fibers surrounding the spacer, to generate a hollow cylinder of light for transmission to the darkfield condenser. The system provides improved resolution and contrast, and is well suited for adaptation to fluorescence microscopy techniques.

33 Claims, 10 Drawing Sheets
(4 of 10 Drawing Sheet(s) Filed in Color)

U.S. PATENT DOCUMENTS

| | | | | |
|---|---|---|---|---|
| 4,894,760 | A | | 1/1990 | Callahan ................... 362/293 |
| 4,974,094 | A | * | 11/1990 | Morito ....................... 348/370 |
| 5,113,332 | A | | 5/1992 | Richardson ................ 362/282 |
| 5,394,268 | A | * | 2/1995 | Lanni et al. ................. 359/386 |
| 5,400,135 | A | | 3/1995 | Maeda ........................ 356/237 |
| 5,452,054 | A | | 9/1995 | Dewa et al. ................... 355/67 |
| 5,528,368 | A | | 6/1996 | Lewis et al. ................. 356/346 |
| 5,734,498 | A | | 3/1998 | Krasieva et al. ............. 359/387 |
| 5,820,250 | A | * | 10/1998 | Betts et al. .................. 362/216 |
| 5,841,577 | A | | 11/1998 | Wachman et al. ........... 359/386 |
| 6,004,001 | A | | 12/1999 | Noll ............................. 362/30 |
| 6,101,037 | A | | 8/2000 | Park et al. .................... 359/618 |
| 6,181,471 | B1 | | 1/2001 | Miyoshi ...................... 359/388 |
| 6,628,385 | B1 | | 9/2003 | Osipchuk et al. ............ 356/318 |
| 6,690,509 | B2 | | 2/2004 | Vodyanoy et al. ........... 359/368 |
| 6,704,140 | B1 | * | 3/2004 | Richardson ................. 359/387 |
| 6,755,555 | B2 | | 6/2004 | Bloom et al. ................ 362/293 |
| 6,812,446 | B2 | | 11/2004 | Kreh ........................ 250/201.3 |
| 6,839,166 | B2 | | 1/2005 | Fukushima et al. .......... 359/368 |
| 6,865,013 | B2 | | 3/2005 | Vodyanoy et al. ........... 359/305 |
| 6,947,127 | B2 | | 9/2005 | Wolleschensky et al. ...... 356/73 |
| 2002/0088952 | A1 | * | 7/2002 | Rao et al. ............... 250/559.45 |
| 2002/0135871 | A1 | * | 9/2002 | Vodyanoy et al. ........... 359/389 |
| 2003/0086163 | A1 | * | 5/2003 | Aono et al. .................. 359/388 |
| 2003/0090792 | A1 | * | 5/2003 | Kenny et al. ................. 359/385 |
| 2004/0239797 | A1 | | 12/2004 | Masuda ....................... 348/362 |
| 2004/0258405 | A1 | | 12/2004 | Shiratori et al. .............. 396/458 |
| 2004/0262529 | A1 | | 12/2004 | Yoshida et al. ............... 250/372 |
| 2005/0238347 | A1 | | 10/2005 | Oh ............................... 396/449 |
| 2006/0001973 | A1 | | 1/2006 | Peterson et al. ............. 359/618 |

FOREIGN PATENT DOCUMENTS

| | | | |
|---|---|---|---|
| EP | 0504940 A2 | | 9/1992 |
| GB | 2 195 467 A | | 4/1988 |
| JP | 2002-202459 | * | 7/2002 ................. 359/385 |
| WO | WO 98/45744 | | 10/1998 |

OTHER PUBLICATIONS

English Abstract of Reference JP 9-288237.

George E. Cragg et al., "Lateral Resolution Enhancement with Standing Evanescent Waves", Jan. 1, 2000, pp. 46-48, Optics Letters, Optical Society of America.

Vitaly Vodyanoy, "High Resolution Light Microscopy of Live Cells", May 2005, pp. 26-28 & 17, Microscopy Today.

Xiaolin Nan et al., "Lights up Lipids in Living Cells", Reprinted from the Aug. 2004 issue of Biophotonics International, pp. 1-4, CARS Microscopy, Live Cell Imaging, A Laurin Publication Biophotonics International.

Tim Richardson, "Test Slides: Diatoms to Divisions—What Are You Looking At? Part I", pp. 1-6, Bio-Microtech Inc., Umt 4.670 Hardwick Road, Ontario, L7E 5TL, Canada.

Prof.Dr.Phil. J. Eisenbrand, Priv.Doz.Dr.Med.G.Werth, "Fluoreszenz-Microskopie", Leipzig 1959, Akademische Verlagsgesellschaft Geest & Protig K.-G.

Albert H. Coons, Hugh J. Creech and R. Norman Jones (Introduced by: J.F. Enders), "Immunological Properties of an Antibody Containing a Flourescent Group", pp. 200-203, From the Department of Bacteriology and Immunology, Harvard Medical School, and the Chemical Laboratory, Harvard University.

Ji-Xin Cheng and X. Sunney Xie, "Coherent Anti-Stokes Raman Scattering Microscopy: Instrumentation, Theory, and Applications", Jun. 14, 2003; In Final Form: Oct. 2, 2003, published on the web Dec. 25, 2003, pp. 827-840, J. Phys. Chem. B 2004, Department of Chemistry and Chemical Biology, Harvard University, 12 Oxford Street, Cambridge, Massachusetts 02138.

Mathias Flörsheimer, Christof Brillert, and Harold Fuchs, "Chemical Imaging of Interfaces by Sum Frequency Microscopy", Received Nov. 5, 1998. In final From Jan. 14, 1999 Langmuir 1999, Published on the web Feb. 24, 1999, pp. 5437-5439, Physical Institute, University of Münster, Wilhelm-Klemm-Strasse 10, D-48149 Münster, Germany.

Lord Rayleigh, Sec. R.S., "XV. On the Theory of Optical Images, with Special Reference to the Microscope", 1896, vol. XLII, pp. 167-195, Lord Rayleigh. Philosophical Magazine.

Maksymilian Pluta, "Advanced Light Microscopy", 1989, pp. 211-216 vol. 2, Elsevier Amsterdam-Oxford-New York-Tokyo PWN-Polish Scientific Publishers, Warszawa.

Arnold Vinrub, Oleg Pustovyy, and Vitaly Vodyanoy, "Resolution of 90 nm ($\sqrt{5}$) in an optical transmission microscope with an annular condenser", Received Jun. 12, 2006, posted Jul. 16, 2006, (Doc ID 71923) Published Sep. 11, 2006, Oct. 1, 2006, vol. 31 No. 19, pp. 2855-2857, Department of Anatomy, Physiology and Pharmacology, College of Veterinary Medicine, Auburn University, Auburn, Alabama 36849.

JiXin Cheng, Y. Kevin Jia, Gengfeng Zheng, and X. Sunney Xie, "Laser-Scanning Coherent Anti-Stokes Raman Scattering Microscopy and Applications to Cell Biology", Jul. 2002, vol. 83, pp. 502-509, Department of Chemistry and Chemical Biology, Harvard University, Cambridge, Massachusetts 02138, and SEG, Olympus America Inc., Biophysical Journal Department, Melville, New York 11747-3157 USA.

Barbara Foster, "Focus on Microscopy: A Technique for Imaging Live Cell Interactions and Mechanisms", Nov. 2004, Reprinted from American Laboratory, 5 pages.

Frithjof A.S. Sterrenburg, "Crystal Palaces—Diatoms for Engineers", pp. 1-14, Westerstraat 47, 1655LC Sijbekarspel The Netherlands, fass@wxs.nl. Research Associated, National Natural History Museum "Naturalis", Leyden, The Netherlands).

\* cited by examiner

Glioma cells

Glioma Cells

MICROSCOPE ILLUMINATION DEVICE AND ADAPTER THEREFOR

CROSS-REFERENCE TO RELATED APPLICATIONS

This application claims the benefit of U.S. Provisional Patent Application Ser. No. 60/563,175, filed Apr. 16, 2004; U.S. Provisional Patent Application Ser. No. 60/634,850, filed Dec. 10, 2004; U.S. Provisional Patent Application Ser. No. 60/650,607, filed Feb. 7, 2005; U.S. Provisional Patent Application Ser. No. 60/655,805 filed Feb. 24, 2005; and U.S. Provisional Patent Application Ser. No. 60/660,484, filed Mar. 10, 2005; all of which are hereby incorporated herein by reference in their entireties for all purposes.

FIELD OF THE INVENTION

This invention relates generally to the field of darkfield microscopy; and more particularly to a device and method for improved resolution that can optionally be combined with fluorescence microscopy.

BACKGROUND OF THE INVENTION

All living creatures, including human beings, are made of cells. A majority of life forms exist as single cells that perform all functions necessary to continue independent life. Most cells are far too small to be seen with the naked eye and require the use of a high-power microscope to observe their behavior. Since their invention in the late 1500s, light microscopes have enhanced our knowledge of biology, human physiology and anatomy, biomedical research, medical diagnostics, and materials science. The science of microscopy has advanced to include a variety of techniques to enhance resolution.

Continuing advances in microbiology require a closer and closer study of biochemical events that occur on a cellular and intracellular level. The challenge in microscopy today is not only the enhancement of finer and finer resolution, but also the development of techniques for observing biochemical events in real time, as they happen, without destroying the biological specimen in the process.

Resolution is the ability of a microscope to distinguish between two objects that are very close together. A microscope with a resolution of 1,000 Å (1,000 Angstroms; equal to 100 nanometers or $100 \times 10^{-9}$ meters), for example, can make objects as close together as 100 nanometers independently visible. Objects and features smaller than 100 nanometers cannot be resolved (i.e., distinguished). The typical resolution or practical resolving power of several types of microscopes currently available are approximately 2,000 Å for visible light microscopes, 1,000 Å for ultraviolet microscopes, 150 Å to 300 Å for scanning electron microscopes, and 2 Å to 4 Å for transmission electron microscopes.

The ultraviolet microscope offers finer resolution and better magnification than an ordinary light microscope, but it has serious disadvantages for the study of living specimens. Ultraviolet light damages or kills many kinds of living biological specimens, making observation of many biological processes impossible. When ultraviolet light strikes a specimen, it excites fluorescence within the molecules of the specimen so that the specimen itself emits a fluorescent light. If the specimen does not produce fluorescence naturally, then it must be stained with a fluorescent dye. Many fluorescent dyes bind strongly to elements such as enzymes within living cells, changing their qualities and significantly altering the cellular biochemistry. Other dyes produce too much fluorescence or absorb too much of the ultraviolet light to be useful.

The operation of an ultraviolet microscope requires a great deal of skill. Because ultraviolet light damages the human eye, the image can only be observed by ultraviolet video cameras or specially-equipped still cameras. Also, the quartz optics required for ultraviolet microscopes are typically much more expensive than the glass components used in visible light microscopes.

Because most bacteria and viruses are too small to be seen even with an optical microscope, an electron microscope is generally used to view such organisms. Although electron microscopes offer very fine resolution, the specimen typically must be prepared by high-vacuum dehydration, freezing, impregnation with heavy metals, and is subjected to intense heat by the electron beam, making the observation of living specimens impossible. The dehydration process also alters the specimen, leaving artifacts and cell damage that were not present in nature. Also, in order to view the steps in a biological process, dozens of specimens must be viewed at various stages in order to capture each desired step in the process. Each selected specimen must then be prepared, using a process that can take up to two hours per specimen.

The high cost of an electron microscope represents another barrier to its use in the life sciences. Electron microscopes are large and often occupy an entire room. The operation and adjustment of an electron microscope, like an ultraviolet microscope, requires highly-skilled technicians, introducing yet another cost of maintaining and staffing an electron microscopy facility. Thus, the electron and ultraviolet microscopes available today generally do not offer a technique for observing living, unaltered biological specimens in real time.

Many biological properties can only be viewed in living cells. Such properties include transport, streaming, Brownian motion, diffusion, phagocytosis, pinocytosis, mitosis, immuno-fluorescence, and cell interactions. Biomedical technologies including, but not limited to, gene therapy, artificial insemination, new drug development, cell culturing and cloning, cell regeneration, implantation, biodetecting, and biotherapeutics require the visualization of living cells and cellular processes. While the nature of these phenomena can sometimes be inferred through examining electron micrographs before and after these processes occur, such processes are more preferably studied in depth while they are occurring.

Fluorescent microscopes can be useful to the study of bacteria, animal, and plant cells, as they show primary fluorescence (autofluorescence) when illuminated with ultraviolet light. A fluorescent microscope is a microscope for observation of small objects by a light of their fluorescence. Fluorescence is a short time luminescence with a lifetime of about $10^{-8}$-$10^{-9}$ seconds, in contrast with phosphorescence that has a much longer lifetime. Fluorescence is most commonly generated by excitation with light. The emitted fluorescence light normally has a longer wavelength than that of the exciting light. Three important steps can divide the process of fluorescence. First, a molecule is excited by an incoming photon during the first few femtoseconds ($10^{-15}$ seconds). During the next few picoseconds ($10^{-12}$ seconds), the molecule goes through a vibrational relaxation of an excited state electron to the lowest energy level of the intermediate states. Finally, emission of a longer wavelength photon and recovery of the molecule into the ground state occurs during a few nanoseconds ($10^{-9}$ seconds). The whole process from excitation of the molecule by an excitation light (EL) to emission of a longer wavelength fluorescent light (FL) is used for fluorescent microscopy.

Initial studies on fluorescent microscopy were carried out during the early part of the twentieth century by August Kohler and Carl Reichert. The first practical fluorescent microscopes were demonstrated by Otto Heimstadt and Heinrich Lehmann in 1911. A short time later, Stanislav von Provazek and Alfred Coles used organic dyes termed "fluorochromes" for securing secondary fluorescence. The secondary fluorescence for the study of sections of tissues and organs stained with fluorochromes was thoroughly investigated by Max Haintinger. However, in 1941 the real revolution in fluorescent microscopy occurred when Albert Coons developed a technique for labeling antibodies with fluorescent dyes ("fluorescent labeled antibodies"), and thus introduced the field of immunofluorescence, which is now a standard method.

The main function of a fluorescent microscope is to illuminate a sample with light of a specific wavelength (excitation light), excite the molecules of the sample with a fluorescent light, and then separate a weak emitted fluorescence from the excitation light, so that the emitted fluorescence can be observed. A special light source and the presence of two filters typically characterize the optical pathways of the fluorescent microscope: one filter is placed before a condenser and the other filter is placed after the objective. The first filter transmits only exciting radiation, and the second filter transmits only emitted fluorescent light. Thus, the excitation light incident on a sample is removed, while fluorescent light is directed to the observer's eye, or to a recording device. The light source should provide a short-wavelength light such as UV and/or blueviolet light. Currently, there are two different optical designs of fluorescent microscopes in common usage: one uses a transmitted light illumination ("dia-fluorescence microscopy") and the other employs a reflected light ("epi-fluorescence microscopy").

The light of the wavelengths required for fluorescence excitation are selected by an excitation filter, which transmits only exciting light and suppresses light of all other wavelengths. A certain part of the exciting light is adsorbed by the sample and almost instantaneously reemitted at longer wavelengths as fluorescence light. A barrier filter transmits the fluorescence light (emission light). The rest of the excitation light which passes through or reflects from the sample is absorbed by the barrier filter. As a result, a color image of the sample is observed (or recorded) against a dark background.

Early fluorescence microscopes were generally brightfield transmitted light microscopes equipped with excitation and barrier filters. The transmitted light fluorescence microscope was greatly improved by using a darkfield condenser. A darkfield condenser projects light onto the sample at oblique angles, which prevents excitation light from directly entering the objective. Certain difficulties of the conventional transmitted light fluorescence light microscope made the reflected light fluorescence microscope the instrument of choice by many users. Although transmitted light fluorescence microscopy has proven valuable in various applications, the technique has some disadvantages, which include the following: (1) the numerical aperture of the objective needs to be reduced in order to prevent excitation light from entering the objective, which in turn reduces light intensity and resolution; (2) the conventional darkfield method is very wasteful of light (i.e., not very efficient); (3) some users find it difficult to align a darkfield condenser; (4) the emitted fluorescent light passes through the sample before reaching the objective, and therefore the light is partly absorbed and scattered, which results in diffuse and less intense images; and (5) the conventional darkfield technique precludes the use of simultaneous fluorescence viewing together with phase microscopy or Nomarski differential interference contrast microscopy. Because of all of these problems of using darkfield transmitted fluorescence microscopy (dia-fluorescence microscopy), brightfield reflected fluorescence microscopy (epi-fluorescence microscopy) is generally preferred.

The Nature of Light

Light is sometimes referred to as a type of electromagnetic radiation because a light wave consists of energy in the form of both electric and magnetic fields. In addition to the light we can see, the electromagnetic spectrum includes radio waves, microwaves, and infrared light at frequencies lower than visible light. At the upper end of the spectrum, ultraviolet radiation, x-rays, and gamma rays travel at frequencies higher than visible light.

Wavelength is the distance between any two corresponding points on successive light waves. Wavelength is measured in units of distance, usually billionths of a meter. The human eye can see wavelengths between 400 and 700 billionths of a meter. Frequency is the number of waves that pass a point in space during any time interval, usually one second. Frequency is measured in units of waves per second, or Hertz (Hz). The frequency of visible light is referred to as color. For example, light traveling at 430 trillion Hz is seen as the color red.

The wavelength of light is related to the frequency by the simple equation $$f = c/L$$

where c is the speed of light in a vacuum (299,792,458 meters per second), f is the frequency in Hertz (Hz) or cycles per second, and L is the wavelength in meters.

Microscope Resolution

The resolution or resolving power of a light microscope can be calculated using Abbe's Formula:

$$D = L/2NA$$

where D is the resolving power of a microscope in meters, L is the wavelength in meters of the incident light, and NA is the numerical aperture of the microscope. The numerical aperture, generally, indicates the angle at which light strikes the specimen being viewed.

Light Scattering

When a light wave passes through a specimen, most of the light continues in its original direction, but a small fraction of the light is scattered in other directions. The light used to illuminate the specimen is called the incident light. The scattering of incident light through various specimens was studied by Lord John William Strutt, the third Baron Rayleigh (Lord Rayleigh) in the late 1800s, and later by Albert Einstein and others.

Lord Rayleigh observed that a fraction of the scattered light emerges at the same wavelength as the incident light. Because of this observation, light that is scattered at the same wavelength as the incident light is a phenomenon called Rayleigh scattering (also called resonant scattering or elastic light scattering).

In 1922, Arthur H. Compton observed that some of the scattered light has a different wavelength from the incident light. Compton discovered that, when light passes through a specimen, some of the light scatters off the electrons of the specimen molecules, producing scattered light in the X-ray region of the spectrum.

Raman Scattering

In 1928, Professor Chandrasekhara V. Raman and Professor K. S. Krislman discovered that the scattered light observed by Compton was caused by vibrations within the molecules of the specimen. Because of his discovery, light that is scattered due to vibrations within the molecules of a specimen is a phenomenon called Raman scattering (also called non-resonant or inelastic light scattering). In 1930, Raman received the Nobel Prize in Physics for his discovery.

When a specimen is bombarded with incident light, energy is exchanged between the light and the molecules of the specimen. The molecules vibrate, producing the phenomenon known as Raman scattering. The molecular vibrations cause the specimen itself to emit scattered light, some of which scatters at a higher frequency (f+$\Delta$f) than the incident light frequency (f), and some of which scatters at a lower frequency (f−$\Delta$f). The $\Delta$f represents the change in frequency (sometimes called the frequency shift) produced by Raman scattering.

In summary, when incident light strikes a specimen, the scattered light includes Rayleigh-scattered light at the same frequency (f) as the incident light, higher frequency (f+$\Delta$f) Raman-scattered light, and lower-frequency (f−$\Delta$f) Raman-scattered light.

Intensity Depends on the Specimen

Because Raman-scattered light is produced by molecular vibrations within the specimen, the intensity of the Raman-scattered light varies depending upon the type of specimen being viewed. For example, a specimen of blood cells may produce high-intensity Raman-scattered light, while a specimen of skin cells may produce lower-intensity Raman-scattered light. One way to harness the resolving power of Raman-scattered light is through the use of a darkfield condenser to focus the incident light on the specimen.

Darkfield Microscopy

Darkfield observation in microscopy uses a condenser to shape the incoming light into a cone of light with its vertex or focal point directed toward the specimen. A darkfield condenser usually includes a centrally-disposed opaque stop and one or more internal lenses or mirrors to shape the light into the desired hollow cone shape. The opaque stop blocks a large portion of the incoming light, allowing only a hollow cylinder of light enter the condenser.

In darkfield microscopy, if there is no specimen on the microscope stage and the numerical aperture of the condenser is greater than that of the objective, the cone-shaped light rays converge at or near the stage, then diverge beyond the stage such that they do not enter the objective lens, and the field of view will appear dark. When a specimen is present, the cone-shaped light rays strike the specimen and are scattered, diffracted, reflected, and/or refracted by the various features of the specimen that create optical discontinuities. Some of these light rays enter the objective lens, revealing the features of the specimen, which appear against a dark background.

Many types of condensers are available and in use today. In a cardioid darkfield condenser, the incoming light passes around a central opaque stop, strikes a convex mirror, and then strikes an internal concave mirror having a spherical surface and a cardioidal surface. A paraboloid darkfield condenser works much like the cardioid, except the internal mirror is parabolic in shape. In an Abbe darkfield condenser, the incoming light passes around a central opaque stop, then passes through a generally convex lens, and finally passes through a second lens. The Abbe darkfield condenser may include a variable internal aperture. Other types of darkfield condensers include the bicentric, bispheric, Cassegrain, spot-ring bicentric, and Nelson-Cassegrain.

After the incoming light passes around the central opaque stop, the light is shaped like a thin-walled hollow cylinder. The hollow cylinder of light then strikes the internal lenses or mirrors, where the light is refracted into the desired hollow cone of light. The refraction of light usually takes place near the perimeter of the internal lens elements, where optical correction is often the poorest. Therefore, to obtain a precise hollow cone of light, the internal lenses are made with great precision to avoid creating anomalies. Precision grinding of lenses and mirrors greatly increases the cost of a darkfield condenser.

The opaque stop inside a darkfield condenser is carefully aligned in the center, to create a uniform hollow cylinder of light. A poorly-centered stop can skew the hollow cone of light, causing uneven illumination and other undesired optical effects that interfere with the image quality. Because the condenser requires extremely precise alignment, it often takes a highly-skilled operator to align a darkfield microscope system. The alignment sensitivity also makes the darkfield system vulnerable to minute vibrations.

Because the opaque stop blocks a large portion of the incoming light, a powerful light source is usually required. In addition to being wasteful, high-power light sources are expensive to operate and maintain, and the excess heat generated may cause undesirable heating of the condenser body, the microscope stage, and the specimen.

Thus, it can be seen that needs exist for improved devices, systems, and methods for viewing living biological specimens with better resolution, including their cellular structures and functions in real time. It is to the provision of such devices, systems, and methods meeting these and other needs that the present invention is primarily directed.

SUMMARY OF THE INVENTION

In its various forms, the present invention provides an improved illumination system for a microscope, providing superior resolution and image contrast, and very efficient usage of light for sample illumination. In an example form of the invention, the illumination system includes an illumination device having a light source coupled to a darkfield condenser, for focusing a hollow cone of light onto a specimen under observation. The invention also includes an adapter for enhancing the economy of light transmission to the specimen. The components of the illumination device are preferably housed in an integral housing and/or are substantially rigidly coupled to one another to maintain alignment and facilitate efficient setup and use. The system and method of the present invention are particularly well suited for adaptation to fluorescence microscopy techniques.

In one aspect, the present invention is an illumination device for a microscope. The illumination device preferably includes at least one light source for generating light to illuminate a sample for microscopic observation, at least one collimating lens for collimating light generated by the light source, and a darkfield condenser for receiving collimated light and directing a hollow cone of light onto the sample under observation.

In another aspect, the invention is a light guide or adapter for light transmission in an illumination system for a microscope. The adapter preferably includes a spacer centrally disposed relative to a longitudinal axis of the adapter and having a generally planar spacer face at one end thereof. The adapter preferably also includes a plurality of optical fibers positioned around the spacer, each of the plurality of optical fibers having an end face oriented substantially perpendicular to the longitudinal axis of the adapter and positioned proximal the spacer face.

In still another aspect, the invention is a system for microscopically observing a specimen. The system preferably includes a transmitted light microscope, and an illumination device for focusing light onto the specimen under observation by the microscope, the illumination device preferably including a light source, a collimating lens and a darkfield condenser.

In another aspect, the invention is a method of microscopically observing a specimen, the method including the steps of coupling an illumination device to a transmitted light microscope, wherein the illumination device includes a darkfield condenser for focusing a hollow cone of light onto the specimen and a light source for transmitting light to the darkfield condenser so that the illumination device generates internal reflection of light.

In yet another aspect, the invention is a method of microscopically viewing a specimen to diagnose the presence of pathogens. The method includes coupling an illumination device to a transmitted light microscope, wherein the illumination device includes a darkfield condenser for focusing a hollow cone of light onto the specimen and a light source for transmitting light to the darkfield condenser.

In yet another aspect, the invention is a illumination device for a microscope having at least one light source for generating light to illuminate a sample for microscopic observation, at least one collimating lens for collimating light generated by the light source, a darkfield condenser for receiving collimated light and directing a hollow cone of light onto the sample under observation, and an adapter for enhancing efficiency of light transmission from the light source to the darkfield condenser.

In another aspect, the invention is a method of producing full-color fluoroscopic images of a sample under microscopic observation. The method includes illuminating the sample with light having at least one intensity peak wavelength, and inducing fluorescence within the sample under illumination by the light.

In still another aspect, the invention is a method of microscopic observation of a sample comprising simultaneous fluorescence observation and ultra-resolution imaging of the sample.

In another aspect, the invention is a method of real-time imaging of a sample. The method includes applying multiple fluorescence labels to the sample, and simultaneously observing multiple cellular features marked by the fluorescence labels.

In still another aspect, the invention is a method of creating a standing evanescent wave, which includes directing illumination through a high aperture condenser, and internally reflecting light off an interface at an angle greater than the critical angle.

In yet another aspect, the invention is a method of reducing photobleaching in a sample under illumination, which includes selective excitation of fluorescence in the sample.

In yet another aspect, the invention is a method of improving microscopy resolution. The method includes observing a sample under illumination by light directed through a high aperture condenser to generate total internal reflection.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of the invention are explanatory of example embodiments of the invention, and are not restrictive of the invention, as claimed.

BRIEF DESCRIPTION OF THE DRAWINGS

The patent or application file contains at least one drawing executed in color. Copies of this patent or patent application publication with color drawings(s) will be provided by the Office upon request and payment of the necessary fee.

DETAILED DESCRIPTION OF EXAMPLE EMBODIMENTS

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
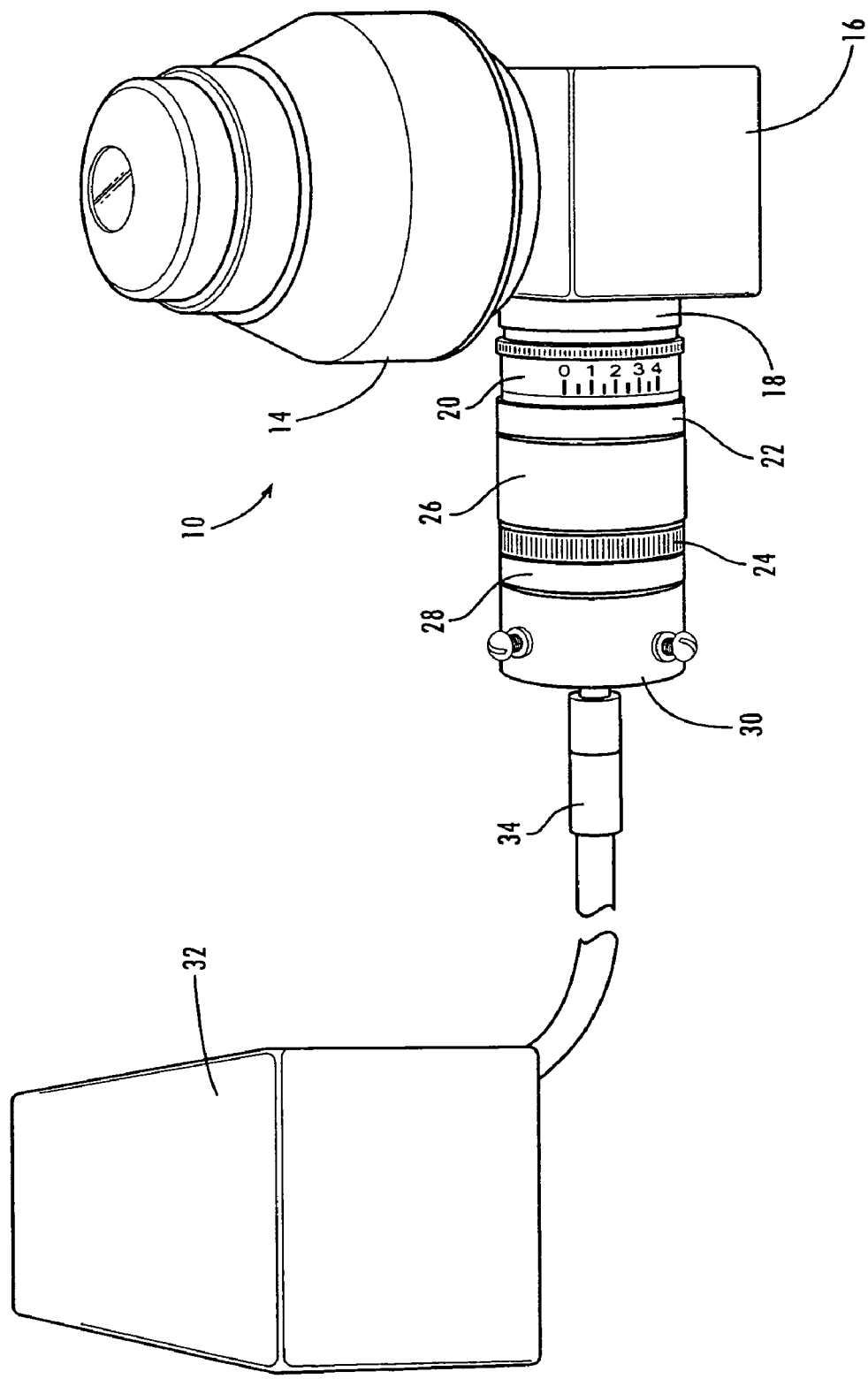
FIG. 1 shows a perspective view of an illumination device for a microscope system in accordance with an example embodiment of the present invention.

FIG. 1 shows a perspective view of an illumination device 10 for use with a microscope system 12 for darkfield microscopy, according to an example embodiment of the present invention. As seen more clearly in the perspective view of FIG. 1 and the side view of FIG. 2, the illumination device 10 comprises a darkfield condenser 14 affixed to an output port of a beam director 16. Preferably, the darkfield condenser is a cardioid darkfield condenser such as a darkfield condenser (oil) Nikon #12000 commercially available from Nikon Corporation, the internal optical elements of which are known by those skilled in the art. Preferably, the numerical aperture of the cardioid darkfield condenser is about 1.2 to about 1.4. Alternately, other forms of darkfield condensers can be used. The darkfield condenser preferably receives incoming light from the light source through a ring-shaped slit on its input side, and focuses and directs a hollow cone of light from its output side onto the sample under microscopic observation, as described in greater detail below. The beam director 16 can be a C-mounted plate beam splitter #R54-825, which is commercially available from Edmund Industrial Optics, or another suitable beam director configured to change the direction of the path of light in a desired manner.

At the input port of the beam director 16 is a simple lens mount 18, such as simple lens mount (12.5 mm holder), #R55-246 commercially available from Edmund Industrial Optics, housing a short pass filter, such as a Tech Spec Shortpass Filter 450 nm Y478-286 commercially available from Edmund Industrial Optics, therein. Preferably, the shortpass filter blocks light having wavelengths greater than about 450 nm. An iris diaphragm barrel 20, such as an iris diaphragm barrel #R03-623 commercially available from Edmund Industrial Optics, is connected to the lens mount 18. A high-contrast UV polarizer 22, such as a high-contrast UV polarizer (12.5 mm), #R47-327 from Edmund Industrial Optics, is connected to the iris diaphragm barrel 20. Micro video imaging lenses 24, such as a finite conjugate MVO micro video imaging lenses #R54-854 commercially available from Edmund Industrial Optics, with associated barrel mounts 26, such as 30 mm barrel/C-mounts, 15 mm extension #R54-630 commercially available from Edmund Industrial Optics, are connected to the high-contrast UV polarizer 22. A heat absorbing glass 28, such as a tech spec heat absorbing glass (12.5 mm diameter), #R45-720 commercially available from Edmund Industrial Optics, is connected to the micro video imaging lenses 24. A light guide mounting adapter 30, such as a C-thread light guide mounting adapter #R53-047 720 commercially available from Edmund Industrial Optics, is connected to the heat absorbing glass. The light guide mounting adapter 30 connects a light source 32 to the illumination system through a light guide 34. The light guide 34 or light transmission conduit may include any of a variety of means for containing and transmitting light from a source to a destination, including but not limited to a simple tube, a chamber, an open pathway between optical elements, or a cable such as a fiberoptic cable.

Preferably, the illumination device 10 is configured to provoke Raman-type light scattering when the incident light strikes a specimen. The illumination device 10 of the present invention may include a single light source or multiple light sources. Preferably, the light source 32 comprises a metal-halide light source, such as a 21-watt metal-halide light source. If the illumination device 10 includes a single light source, then preferably, the light source emits light traveling at multiple frequencies. When the light of multiple frequencies strikes the specimen, the combinatory phenomenon provokes Raman-scattered light, which produces a high-resolution image. U.S. Pat. No. 6,690,509, issued Feb. 10, 2004, and U.S. Patent Application Publication No. US2004-0008522 A1, Jan. 15, 2004, both of which are hereby incorporated by reference herein for all purposes, may be referenced for further understanding of the scattering provoked by light from a single source, the scattering provoked by incoming light from two sources, and the resulting combinatory phenomenon.

Additionally, the illumination device 10 of the present invention may include two light sources, which may be of the same type or different types, such as, but not limited to, metal-halide light sources, lasers, or ultraviolet (UV) light sources. Preferably, a low-power light source, such as a 21-watt metal-halide source is used so as to conserve energy and reduce the amount of stray light. In such an embodiment, the illumination device 10 may include an optical combiner, for example as described in U.S. Pat. No. 6,690,509. The optical combiner combines the light emitted by the two light sources and produces a single combined light that can be transmitted to a microscope. When the light of differing frequencies within the combined light strikes the specimen, the combinatory phenomenon provokes Raman-scattered light which produces a high-resolution image, as described in greater detail by U.S. Pat. No. 6,690,509.

Figure 2:
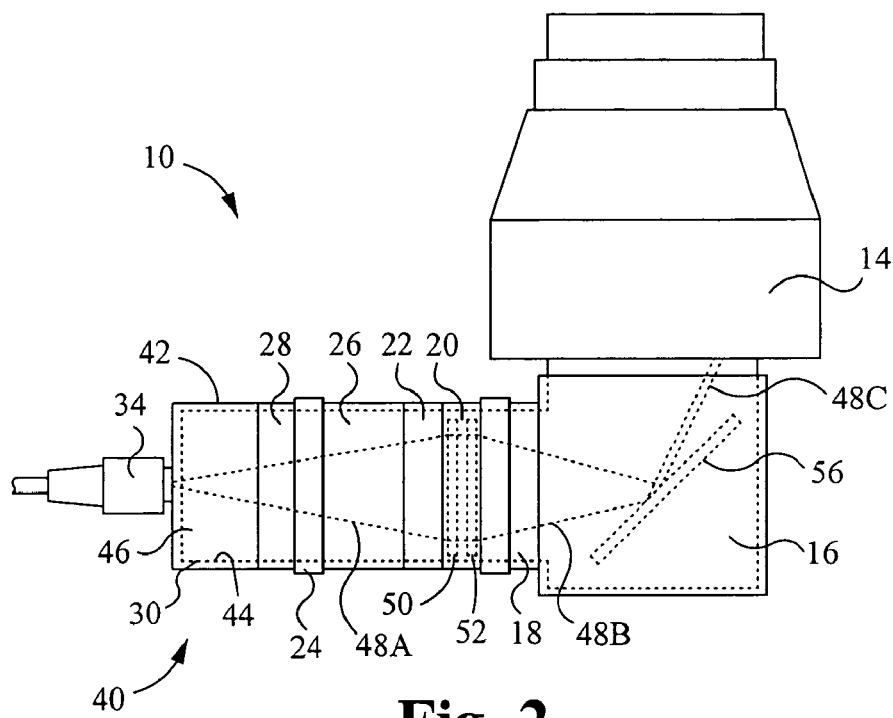
FIG. 2 shows a side view of the illumination device of FIG. 1 and showing internal optical elements in dashed lines.

As seen more clearly in the side view of FIG. 2, the device 10 preferably has a housing 40 with external walls 42 and internal walls 44. For clarity of illustration, FIG. 2 depicts some of the internal optical elements in dashed lines. The internal walls 44 define a chamber 46 therein for containing the light from the light source 32. Light 48A from the light source 34 enters the chamber 46 of the illumination device 10 through the light guide 34, and passes through a first collimating lens 50 and a second collimating lens 52. The first and second collimating lenses 50 and 52 serve to collimate the light, or in other words, produce parallel rays of light. In this aspect, the collimation process removes or filters non-parallel rays of light. By collimating the light used to illuminate a specimen, the resolution of the resulting image can be improved. In addition, collimated light is less susceptible to distortion by tiny imperfections in any of the optical elements in a microscope system. Preferably, one or both of the collimating lenses 50 and 52 may be adjusted or moved in a direction parallel to the path of the light, in order to focus the light on a desired location. The lenses 50 and 52 and/or the housing 40 may also include a mechanism for adjusting the alignment of the lenses.

The collimated light 48B is directed onto the flat mirror 56 of the beam director 16 and reflected into the darkfield condenser 14. In the depicted embodiment, the flat mirror 56 is positioned at an approximately 45° angle so as to reflect the light 48C along a 90° path into the darkfield condenser 14. The darkfield condenser 14 itself has internal optical components, for manipulating the light paths to output a hollow cone of light. For example, in the depicted embodiment, the darkfield condenser 14 has a convex mirror 58, which reflects light onto a concave peripheral mirror which in turn directs the light cone outwardly with its vertex directed toward the specimen 55. The light then illuminates the sample or specimen 55 to be viewed by provoking Raman scattering. Fine focusing of the illumination system 10 allows positioning of the focal point at any depth within the sample. Moreover, the angle at which the light is directed toward the specimen may be adjusted to produce an improved resolution.

Special optical effects due to the interaction of the light with the specimen produce an additional contrast mechanism. The illumination device 10 is similar to differential interference contrast microscopy ("DIC") in some aspects, but the illumination device does not require a prerequisite orientation, has a better contrast, can be used to visualize very small particles, and can be used with birefringent samples.

Figure 3:
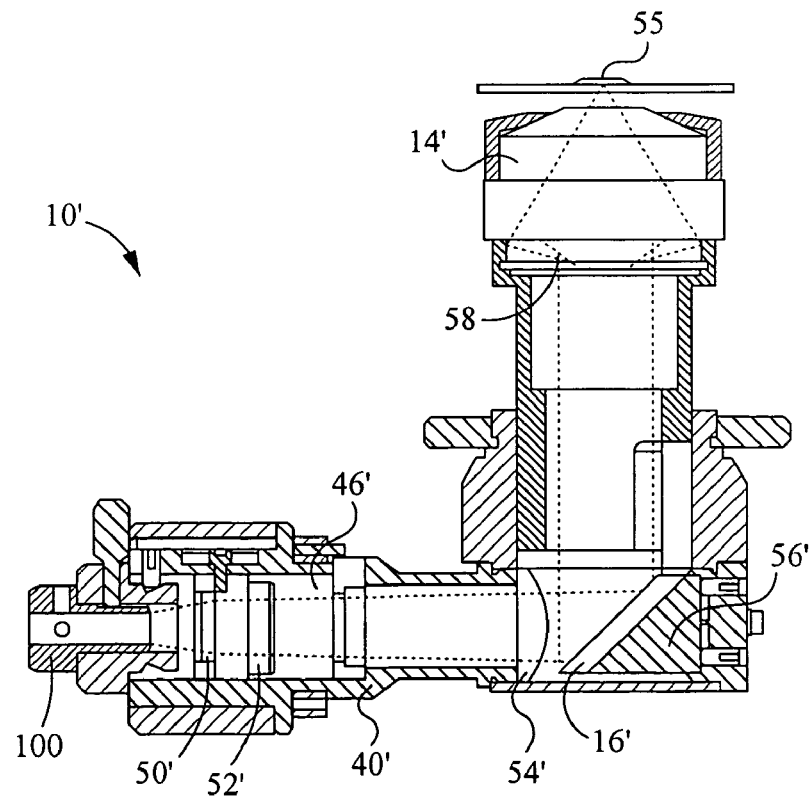
FIG. 3 shows a sectional view of an illumination device according to another example embodiment of the present invention.

FIG. 3 depicts an illumination device 10' according to another example embodiment of the present invention. The illumination device 10' is substantially similar to illumination device 10, but with the exceptions noted herein. The illumination device 10' has three-lens collimator comprising lenses, 50', 52' and 54' for collimating light from the light source 32. Light from a light source is transmitted through an adapter 100, the function and structure of which are described in greater detail below, and enters the interior chamber 46' of the housing 40'. The light is collimated by lenses 50', 52', and 54' and is then reflected into the darkfield condenser 14' by a beam director 16', which has a flat mirror 56' oriented at an approximately 45° angle.

Figure 4:
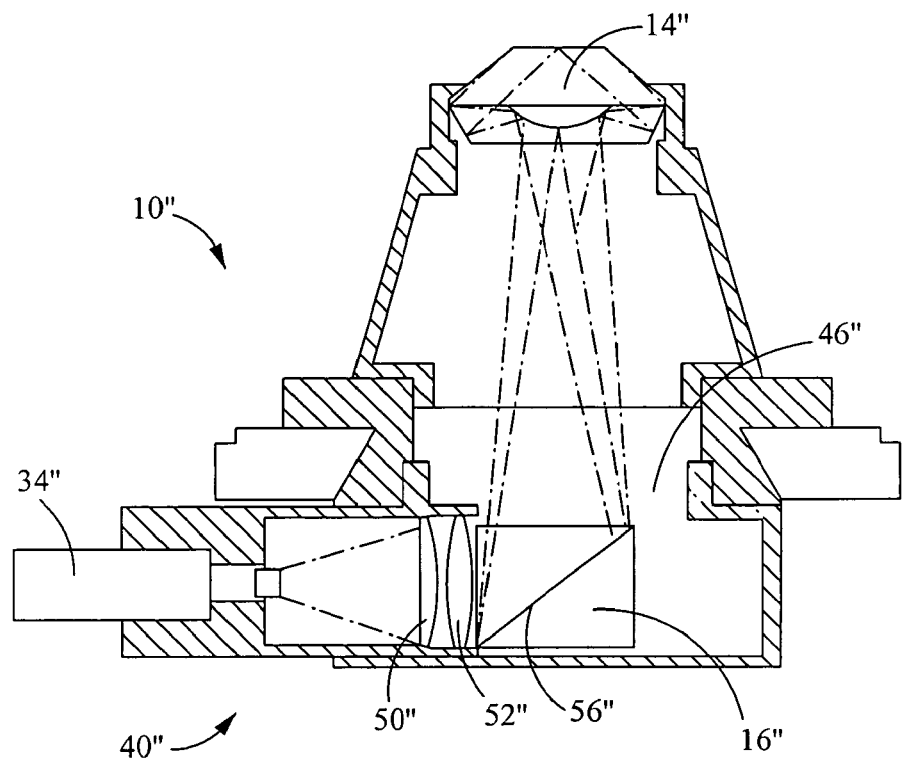
FIG. 4 shows a sectional view of an illumination device according to yet another example embodiment of the present invention.

FIG. 4 depicts an illumination device 10" according to yet another example embodiment of the present invention. The illumination device 10" is substantially similar to illumination device 10, but with the exceptions noted herein. Light from a light guide 34" enters the interior chamber 46" of the housing 40" and then passes through two collimating lenses 50" and 52" positioned near a beam director 16", which has a flat mirror 56" oriented at an approximately 45° angle in order to reflect the light toward the darkfield condenser 14". The light that enters the darkfield condenser 14" is then manipulated by the internal optical elements of the darkfield condenser, and the light emerges from the darkfield condenser in the shape of a hollow cone with its vertex directed toward the specimen. Although not shown, the illumination device 10" may include one or more positioning elements for varying the positions of the collimating lenses 50" and 52".

Figure 5:
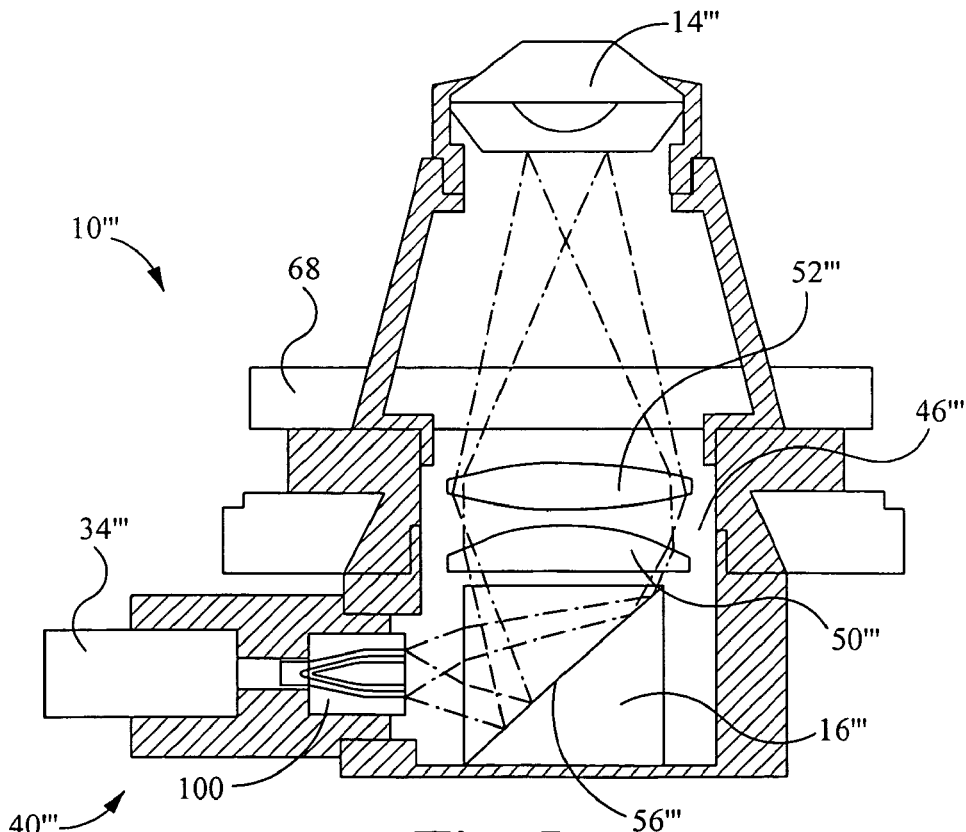
FIG. 5 shows a sectional view of an illumination device according to still another example embodiment of the present invention.

FIG. 5 depicts an illumination device 10''' according to still another example embodiment of the present invention. The illumination device 10''' is substantially similar to illumination device 10", but with the exceptions noted herein. Light from a light guide 34''' is transmitted through an adapter 100, and enters the interior chamber 46''' of the housing 40'''. The adapter 100 improves light economy, thereby allowing use of a lower wattage light source, and example forms of the adapter according to the present invention are described in greater detail below. The light from the adapter 100 is then reflected to the darkfield condenser 14''' by a beam director 16''', which has a flat mirror 56''' oriented at an approximately 45° angle in order to reflect the light toward the darkfield condenser. Once reflected, the light then passes through two collimating lenses 50''' and 52''' positioned near an output port of the beam director 16'''. The light that enters the darkfield condenser 14''' is then manipulated by the internal optical elements of the darkfield condenser, and the light emerges from the darkfield condenser in the shape of a hollow cone with its vertex directed toward the specimen. As depicted in FIG. 5, the illumination device 10''' may include one or more positioning elements 68 for varying the positions of one or both of the collimating lenses 50" and 52" in order to focus the light on the entrance to the darkfield condenser. Additional positioning elements may be used to adjust any of the elements described herein, such as the internal mirror 56''' in a beam director 16''', the alignment of the adapter 100 relative to the darkfield condenser 14''', or other components, and the general alignment of any element within the path of travel of the light being transmitted. In the above example embodiments, the focus distance of the collimating lens or lenses of the illumination device, whether one or a plurality of lenses is used, is about 10 mm.

Figure 6:
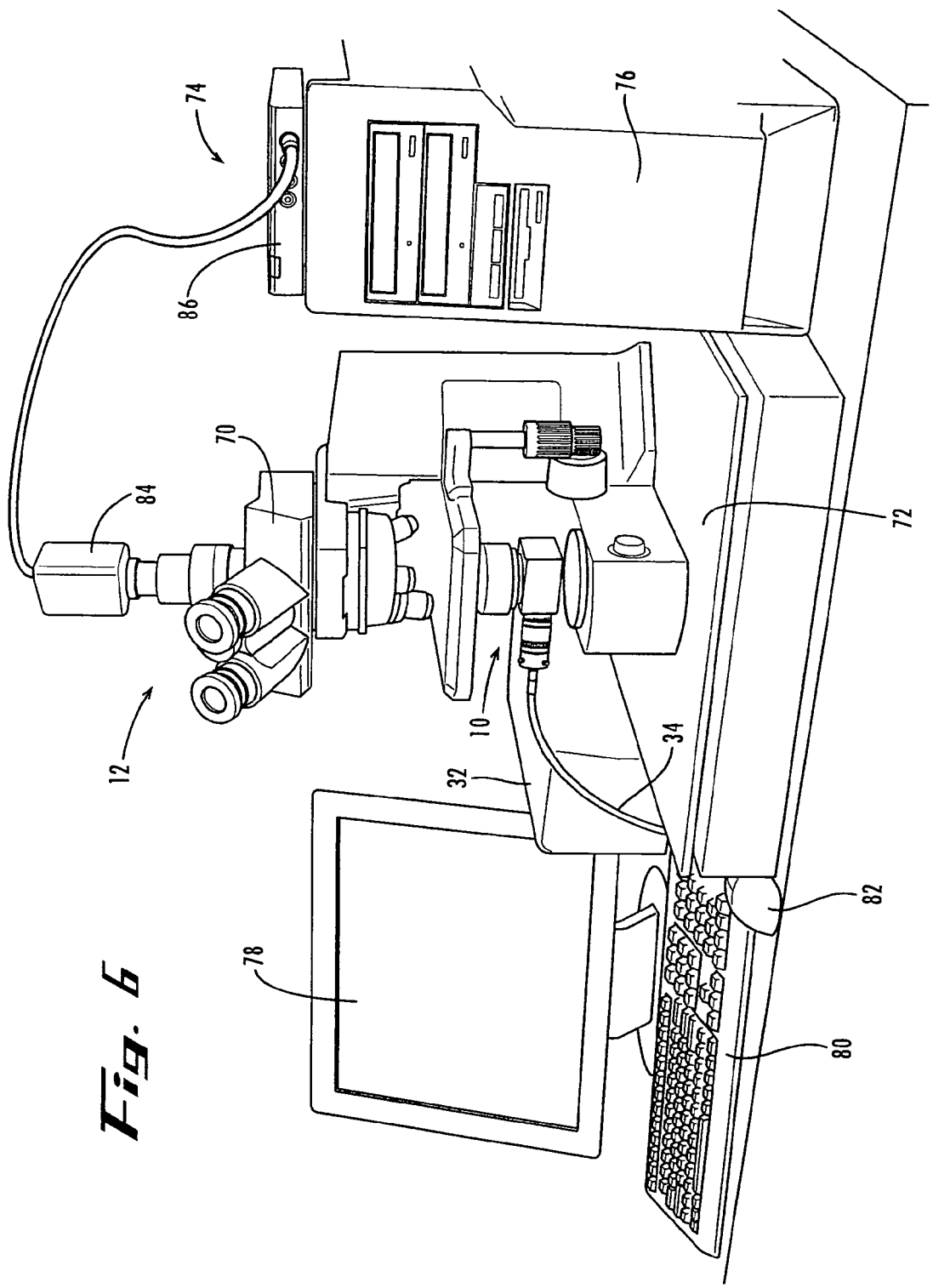
FIG. 6 shows a perspective view of a microscope system incorporating an illumination device according to the present invention.

FIG. 6 depicts a microscope system 12 that can be used in connection with an illumination device according to the present invention, including any of the illumination devices 10, 10', 10", and 10''' described above. The system 12 preferably includes a microscope 70 positioned on an anti-vibrational table or platform 72, which is designed to dampen vibration. For example, the microscope 70 can be an Olympus BX 51 Microscope that is commercially available form Olympus Corporation, although the present invention contemplates the use of any of a variety of transmitted light microscopes. The anti-vibrational table 72 can be for example an anti-vibrational table TMC, Model #66-501 that is commercially available from Technical Manufacturing Corporation. Additionally, the system 12 includes a computer system 74, which includes a processor 76, a display monitor 78, and input devices, such as a keyboard 80 and a mouse 82. In an example embodiment, the computer system 74 is a PC IBM commercial system, P4-3.2 Ghz/1 GB/120 GB/DVD-CD-RW/IEE 1394 PCI/XPP. The system 12 preferably also includes a video camera 84 with an associated control panel connected to the microscope 70 near the eyepiece for recording cellular processes of the specimen, for example. The video camera 84 is connected to the computer processor 76 via an interface 86 such that the images can be displayed on the display screen. In an example embodiment, the video camera 84 is an Astrovid StellaCam-EX that is commercially available from AVA Astro Corporation. The interface module 86, such as the Advance Digital Video Converter ADVC100 commercially available from Canopus Corporation, can provide an interface between the camera 84 and the computer system 74, although other compatible interfaces are contemplated by the present invention.

Figure 13A:
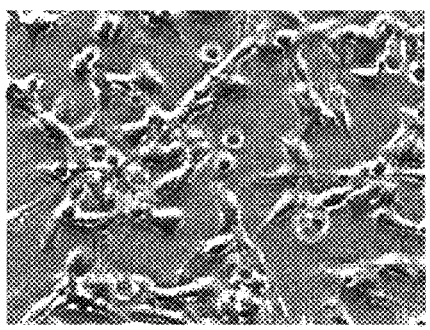
FIGS. 13A and 13B show images of glioma cells produced using a prior art illumination system.
Figure 14A:
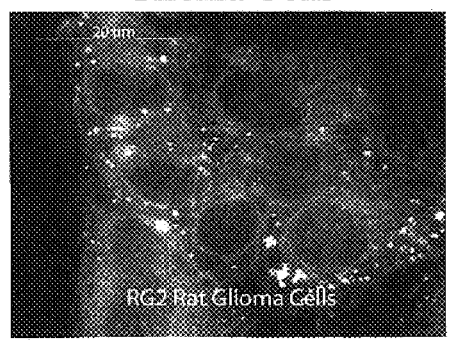
FIGS. 14A and 14B show enhanced resolution images of the glioma cells of FIGS. 13A and 13B produced using an illumination system of the present invention.
Figure 13B:
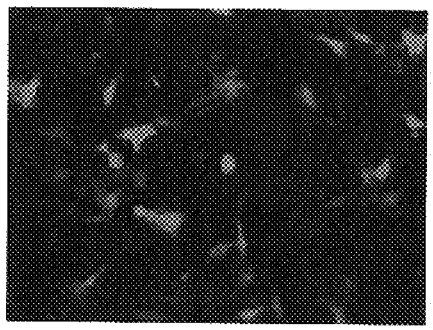
Figure 14B:
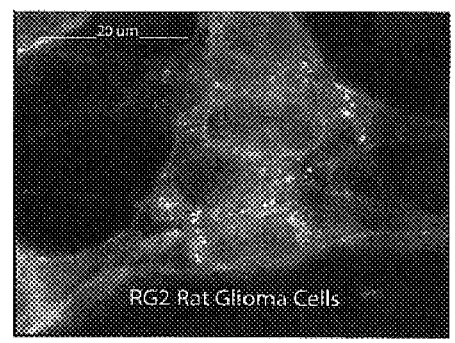

As described herein, the configuration of the illumination device of the present invention provides unique advantages over previously known systems. First, the illumination device provides illumination such as for example Kohler illumination, suitable for very high-resolution imaging. And the illumination device provides "ultra-resolution imaging" by resolving cellular features as small as about 100-250 nm or smaller and detecting features smaller than 60 nm. Ultra high spatial resolution (<150 nm) and contrast is improved, and the detection limit is less than 60 nm. Thus, contrary to phase contrast microscopy, the illumination device of the present invention has a better resolution without any significant image distortions. The illumination device allows viewing of live cells and cell processes while they are occurring in real-time (as compared to electron microscopy, for example, which requires non-living cells, and the cellular structure can be altered when the cell is "killed"). Moreover, specimen/sample preparation techniques such as freezing, dehydration, staining, labeling, and metal deposition can be avoided with the illumination device of the present invention. Exemplary images produced using the illumination system of the present invention are shown in FIGS. 14A and 14B, which show the considerably better resolution of glioma cells, as compared to the images of FIGS. 13A and 13B produced using a prior art system.

Additionally, the darkfield condenser 14 is a fixed, integral component of the illumination device of the present invention, in the sense that it does not need to be aligned, whether up or down relative to the sample or side to side along a horizontal axis beneath the sample, by a highly trained operator. Rather, the entire illumination device of the present invention can be moved up or down towards or away from the sample to focus the volume of light as desired on the sample. The components of the illumination system of the present invention are preferably connected to one another in a substantially rigid assembly, for example by affixing the components within a substantially rigid housing and/or coupling the components directly or indirectly to one another. Moreover, the illumination device of the present invention is self-contained and portable, and can be easily mounted onto various commercially available transmitted light microscopes. The illumination device of the present invention can be configured to function well with an existing microscope without any modifications to the microscope base. Alternately, the illumination device can also be configured to stand alone, without requiring any fixed attachment to the microscope being used. The illumination device may optionally include one or more brackets or collars specifically sized and shaped to fit the device into the base area of any type of microscope, facilitating convenient retrofitting to an existing microscope.

Figure 7:
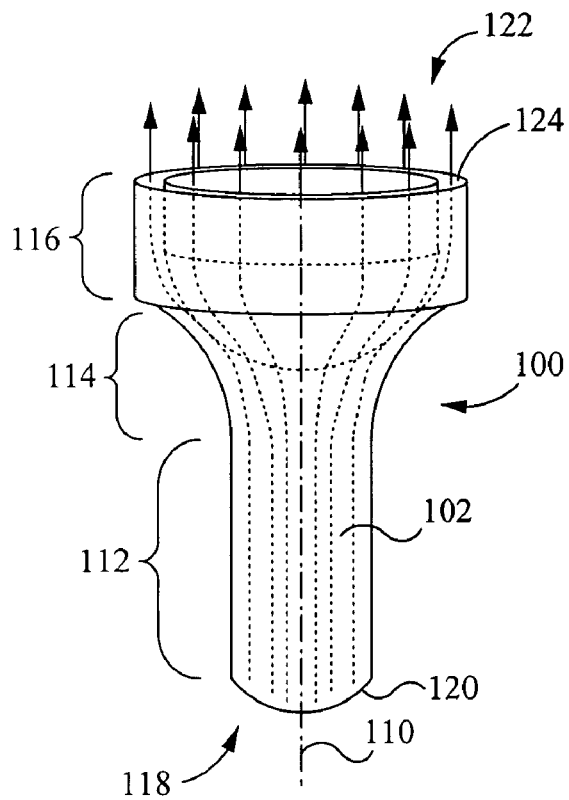
FIG. 7 shows a perspective view of an adapter for use in connection with an illumination device according to an example embodiment of the present invention.

FIG. 7 shows a light guide or adapter 100, suitable for use, for example, in connection with the illumination device of the present invention (including any of the above described example embodiments of the illumination device 10, 10', 10", and/or 10'"), to provide better light economy. Moreover, the adapter 100 can be used in combination with a darkfield condenser (with or without the additional components of the illumination device of the present invention) such that the adapter is sized and shaped to fit within a cavity of the darkfield condenser, which thereby provides a fitting between the light source and the condenser. In such an embodiment, the adapter 100 preferably has a generally cylindrical housing, which may include external threads sized to fit within and match threads on the interior walls of the cavity in the darkfield condenser, although other features may be used to provide a releasable attachment. In an alternative embodiment, the adapter 100 may be permanently attached to the darkfield condenser to form a single integral unit.

When used in combination with the illumination device of the present invention, the adapter 100 is preferably positioned between the light source and the beam director and is sized and shaped accordingly, for example as shown in FIG. 5. The adapter 100 may be a separate component or it may be integral with or coupled to one or more other components of the illumination device. Substantially rigid coupling (directly or indirectly) between the adapter and the illumination device, such as by provision of the two within an integral housing, threaded connections therebetween, press-fit connection, or the like, advantageously maintains alignment of the light paths through the system of the present invention, thereby facilitating efficient setup and operation. As seen more clearly in FIGS. 7-12, in its various forms, the adapter 100 preferably includes a housing 102 and an internal spacer 104 positioned to guide incoming light toward the periphery of the housing 102. One or more optical fibers 106 are located at the periphery of the housing 102 so that the incoming light can travel through the one or more optical fibers 106. Preferably, the optical fibers 106 or filaments are bundled together into a fiber optic cable 108. The cable 108 transmits the light from a light source 32 toward the housing 102, where the individual fibers 106 are separated and distributed around the spacer 104 to form a ring-shaped bundle of fiber ends.

As shown in FIG. 7, a central axis 110 extends through the adapter 100 in a direction generally parallel to the orientation of the darkfield condenser and the microscope in use. Preferably, the optical fibers 106 are separated and oriented around the spacer 104 so as to produce an annular ring of light rays traveling in a direction generally parallel to the central axis 110. The diameter and thickness of this annular ring are preferably configured to approximately match the corresponding dimensions of the ring-shaped inlet slit of the darkfield condenser of the illumination device. The annular ring of light rays thus form a hollow cylinder of light that is preferably aligned precisely with the ring-shaped slit of the darkfield condenser of an illumination device, whereby substantially all of the light from the light source is effectively delivered to the specimen, further enhancing efficiency of light usage and enabling a lower wattage light source to provide improved illumination. Alignment of the adapter and the other components of the illumination system is preferably maintained by housing the components within a substantially rigid housing, and/or direct or indirect coupling therebetween, such as for example by one or more threaded couplings.

The housing 102 includes a first end portion 112, an intermediate portion 114, and a second end portion 116. An entrance 118 is located at a distal end 120 of the first end portion 112, and an exit 122 is located at a proximal end 124 of the second end portion 116. Preferably, the housing 102 has a profile tapered in the direction of the distal end 120. Also preferably, the first portion 112 is generally cylindrical and shaped to receive a bundle of optical fibers 106. The intermediate portion 114 is preferably smoothly curved or stepped to gradually expand from a minimum diameter at its intersection with the first end portion 112 to a maximum diameter at its intersection with the second end portion 116. The second end portion 116 is preferably generally cylindrical in shape, having a diameter sufficient to contain the optical fibers 106 and the internal spacer 104, and a length sufficient to allow the fibers 106 to become oriented more parallel to the central axis 110 toward the exit 122 of the housing 102.

Figure 8:
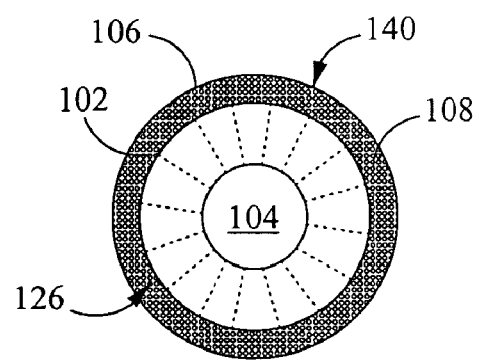
FIG. 8 shows a top view of the adapter of FIG. 7.

As shown more clearly in FIGS. 7 and 8, the optical fibers 106 spread around the spacer 104 to form an annulus 140. Preferably, the separation of optical fibers 106 is generally radial, although a precise radial orientation is not required because of the internal reflective properties of the optical fibers. The fibers 106 may be held in place by frictional and elastic forces inside the adapter 100, with or without adhesive or other fixation means. The optical fibers 106 preferably terminate in an end face 126 of the adapter 100 at or near the exit 122 of the housing 102. Each end face 126 is preferably cut nearly perpendicular to the longitudinal axis of the optical fiber 106, to reduce any non-parallel interference with the light from portions of the fiber body. Additionally, the end faces 126 may be polished smooth to further refine the light being emitted. The housing 102 and the internal spacer 104 are preferably configured to help guide the optical fibers 106 toward a generally parallel orientation with respect to the central axis 110. Additionally, the spacer 104 preferably includes generally cylindrical sides near the top of the spacer 104 in order to better orient the fibers.

Figure 9:
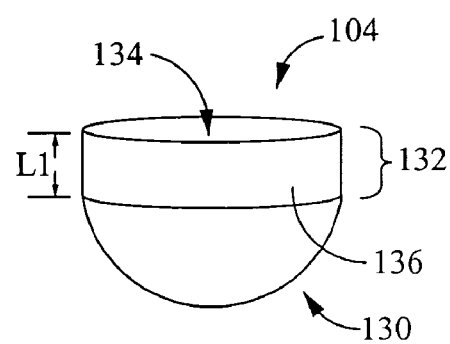
FIG. 9 shows a perspective view of an internal spacer portion of the adapter of FIG. 7.
Figure 10:
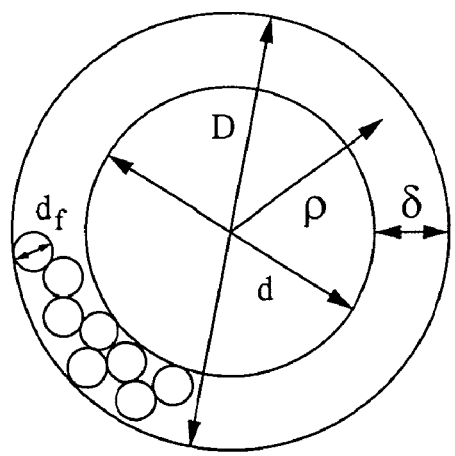
FIG. 10 shows a partial pictorial top view of the adapter of FIG. 7.

FIG. 9 is a perspective illustration of the internal spacer 104. Preferably, the spacer 104 has a generally semi-spherical portion 130, and a generally cylindrical portion 132 with a flat end face 134. The generally cylindrical portion 132 has an exterior wall 136 that helps maintain alignment of the fibers 106 near the face 134 in a generally parallel orientation. The generally cylindrical portion 132 has a length L1 sufficient to allow the fibers 106 to become oriented more parallel to the central axis 110. The spacer 104 may be made of a semi-rigid plastic or any other suitable material having sufficient hardness to maintain the separation of the optical fibers 106 and sufficient flexibility to hold the fibers in place. Preferably, the spacer 104 is sized and shaped according to the size and number of optical fibers 106, so that together the spacer 104 and fibers 106 efficiently fill the space available inside the housing 102. In an example embodiment, the diameter of the spacer 104 approximates the diameter of the opaque stop of the darkfield condenser. In an alternate embodiment, the diameter of the spacer 104 may be somewhat larger than the diameter of the opaque stop, so that the hollow cylinder of light produced is equal to or smaller than the entrance aperture of the condenser. In this manner, most of the light that is directed to the periphery of the adapter 100 enters the darkfield condenser for use in illuminating a specimen, thus enhancing efficiency.

The present invention also includes a method of determining the desired spacer size and cable bundle size using a mathematical model for filling the space available. Using the parameters shown in FIG. 10, the method begins by calculating the surface area (S) of the annular opening at the exit 122 of the adapter 100:

$$S = \frac{\pi}{4} \times (D^2 - d^2) = 2\pi\rho\delta \qquad (1)$$

Where D is the internal diameter of the second portion 116 of the housing 102; d is the external diameter of the generally cylindrical portion 132 of the spacer 104; $\rho$ is the mean radius of the annular opening 140; $\delta$ is the width of the annular opening 140; and $h_f$ is the diameter of an optical fiber 106. The area of the light beam ($S_L$) entering in the darkfield condenser may be described as:

$$S_L = \pi D^2 / 4 \qquad (2)$$

The fibers may be arranged in a hexagonal array or lattice to optimize the space. In this case, the density of the filling (f) is equal to:

$$f = \pi\sqrt{3}/6 \approx 0.907 \qquad (3)$$

From equations (1) and (3), the surface area occupied by the densely-packed fibers ($S_f$) may be approximated as:

$$S_f = 2\pi f \rho \delta \qquad (4)$$

The number of fibers ($N_f$) having a diameter $d_f$ which are needed to fill the adapter is equal to ratio of $S_f$ to the area occupied by a single fiber ($\pi d_f^2/4$). Thus, $$N_f = 8f\rho\delta/d_f^2 \qquad (5)$$

If diameter of the bundle of optical fibers is $d_b$ then the area of the bundle cross-section ($S_b$) may be expressed as:

$$S_b = \pi d_b^2/4 \qquad (6)$$

From equations (1) and (6), the diameter of the bundle may be calculated:

$$d_b = 2\sqrt{2\rho\delta} \qquad (7)$$

Accordingly, the present invention also includes a method for determining the desired size of the bundle or optical cable using the calculated diameter, $d_b$.

The efficiency (K) of the adapter 100 may be described as the ratio of energy of light passing through darkfield condenser 14 with the adapter, compared to the energy without an adapter. Neglecting small losses in the fibers and lenses, the efficiency K may be approximated using equations (1) and (2):

$$K = D^2/(D^2 - d^2) \qquad (8)$$

For example, in a darkfield adapter 100 in which the second portion 116 of the housing 102 has an internal diameter D equal to 16 millimeters, and in which the generally cylindrical portion 132 of the spacer 104 has an external diameter d equal to 14 mm, the following parameters may be approximated:

Internal radius of housing, R=D/2=8 mm.
External radius of spacer r=d/2=7 mm.
Mean radius of annular opening, $\rho$=(R+r)/2=7.5 mm.
Width of annular opening, $\delta$=R−r=1 mm.

Assuming optical fibers with a diameter ($d_f$) of 0.1 mm, and using equation (5), the number of optical fibers in the bundle ($N_{fz}$) may be estimated:

$$N_f = 8 \times 0.907 \times 7.5 \times 1/(0.1)^2 = 5,442 \text{ fibers.}$$

The diameter of the bundle, from equation (7), may be expressed as:

$$d_b = 2 \times \sqrt{(2 \times 7.5 \times 1)} = 7.75 \text{ mm} \approx 8 \text{ mm}$$

and the efficiency K of the adapter may be calculated:

$$K = 16^2/(16^2 - 14^2) = 4.27$$

In this example, the adapter 100 with the parameters shown above transmits about four times or more the light energy into the darkfield condenser 14, as compared to the energy transmitted without using the adapter.

Figure 11:
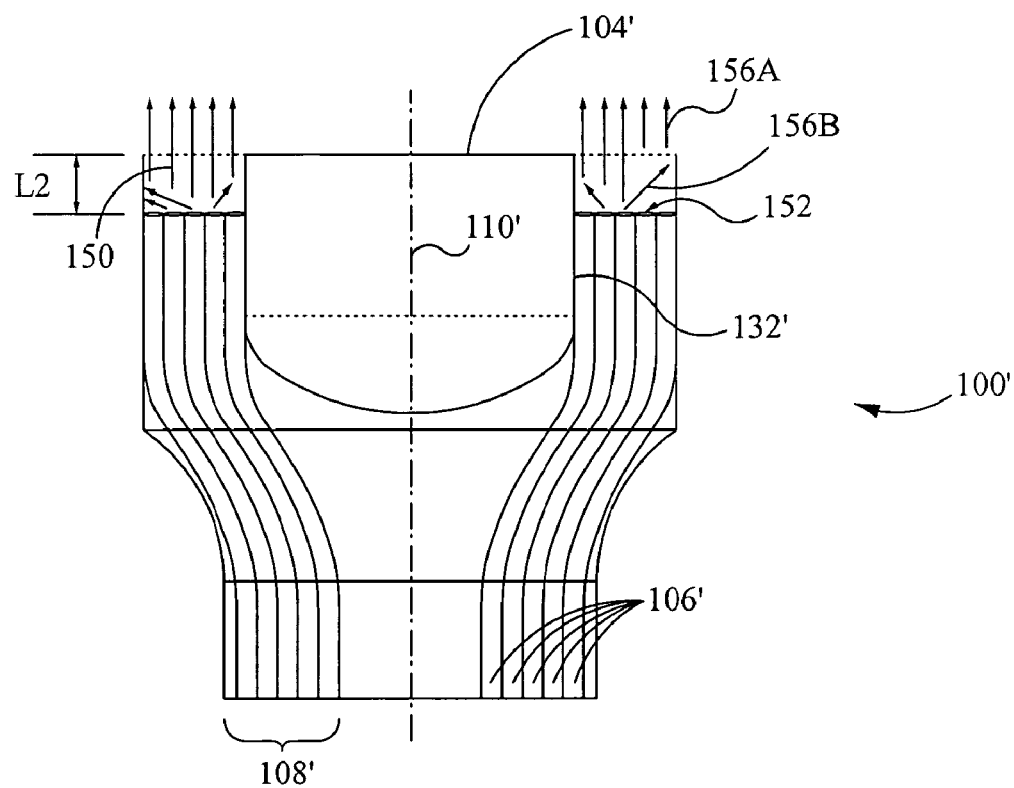
FIG. 11 shows a sectional illustration of a portion of an adapter according to another example embodiment of the present invention.
Figure 12:
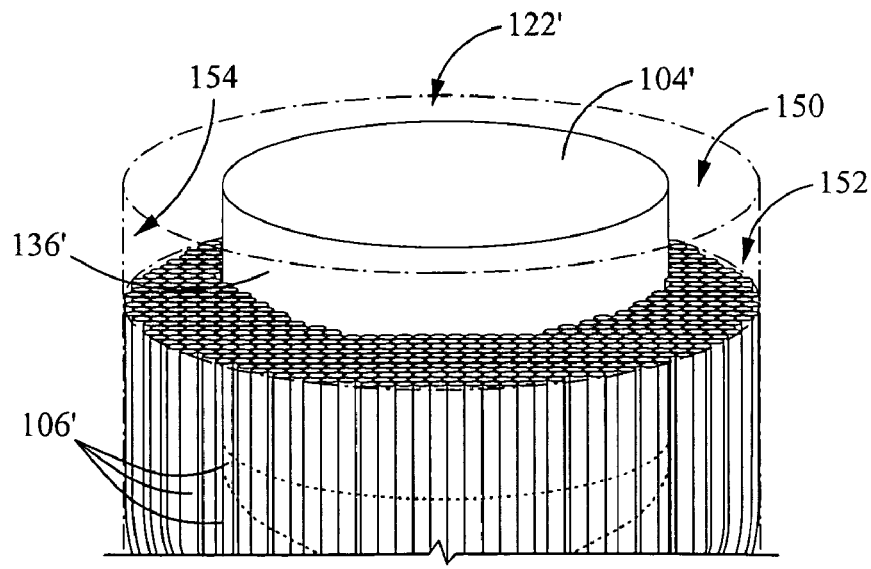
FIG. 12 shows a partial perspective view of the adapter of FIG. 11.

An alternate embodiment of an adapter 100' is depicted in FIGS. 11 and 12. In this embodiment, the adapter 100' includes a collimation chamber 150. Instead of the optical fibers 106 terminating in an end face 126 coplanar with the face 134 of the spacer 130, as in the above-described embodiment, the optical fibers 106' terminate in an intermediate end face 152, as shown more clearly in FIG. 12. In this embodiment, the collimation chamber 150 is defined generally by the plane of intermediate end faces 152, the exterior wall 136' of the spacer, an interior wall 154 of the second portion 132 of the housing 102, and the plane of the exit 122'. In some embodiments, the optical fibers 106' are bundled together into a fiber optic cable 108'. In some embodiments, as illustrated in FIGS. 11 and 12, the optical fibers 106' are separated and oriented around a spacer 104' so as to produce an annular ring of light rays traveling in a direction generally parallel to the central axis 110'.

As shown in the cross-sectional view of FIG. 11, light rays 156 exiting the intermediate end faces 152 include parallel light rays 156A and non-parallel light rays 156B. Preferably, the interior wall 154 and exterior wall 136' has a dark or opaque color or is otherwise treated to absorb the non-parallel light rays 156B. In this aspect, the collimation chamber 150 assists in collimation of light entering the microscope 70 or illumination device 10 (depending on how the system is configured). Preferably, any non-parallel light rays 156B are absorbed or otherwise deterred from entering the darkfield condenser, whereas the parallel light rays 156A pass through the exit 122' and into the condenser. The collimation chamber 150 has a length L2 sufficient to allow the absorption of the non-parallel light rays 156B. The length L2 shown is generally shorter than the length L1 of the generally cylindrical portion 132' of the spacer 104'; however, other configurations are contemplated and may be sufficient to accomplish the collimating effect of the adapter 100' of the present invention. In such an embodiment with a collimation chamber, the precision and polishing of end faces 152 of the optical fibers 106' may not be as critical in terms of the degree of collimation produced by the adapter 100', as any light from not perfectly polished surfaces and not directed vertically will not enter the condenser. However, polished fibers are preferable. If the internal surface of the housing 154 and the external surface of the spacer 104 are polished and mirrored, then light transmission will be maximized because the sloped light coming from the fibers will still be directed to the condenser by reflection between mirrored surfaces. In this case, the light efficiency is very high, and an image can be observed on a background that is not fully black (i.e., a slightly "milky" background). For some applications, the above arrangement is acceptable. However, if an internal surface of housing 154 and an external surface of spacer are blackened, then even though the light transmission is lowered, the background of the image will be very black. This arrangement is useful for obtaining a high contrast and high resolution.

One advantageous known application for the illumination device of the present invention, equipped with or without the adapter of the present invention, is its use in combination with fluorescence microscopy techniques to better view a specimen. For example, a fluorescence marker or optically-interrogatable label, such as but not limited to Texas red dye, fluorescein, DAPI (or 4',6-Diamidino-2-phenylindole), an organic fluorescent dye, Congo red, metal nanoparticles, such as, for example, gold nanoparticles, or quantum dots, is applied to a sample to be fluoresced and observed. General fluorescent microscopy marking techniques using such markers are generally well known by those skilled in the art. In darkfield microscopy, metal nanoparticles and quantum dots are preferable. Metal nanoparticles, which are commercially available, typically have a size of about a few nanometers, and they produce a very strong scattering, which is effective in darkfield microscopy. Quantum dots are semiconductor nanoparticles, typically of a few nanometers in size. They are strongly fluorescent and they can be observed with darkfield imaging. An illumination device having a darkfield condenser is retrofitted to an existing microscope 12 according to the present invention, and the sample can then be viewed/studied/recorded under the microscope.

Figure 15A:
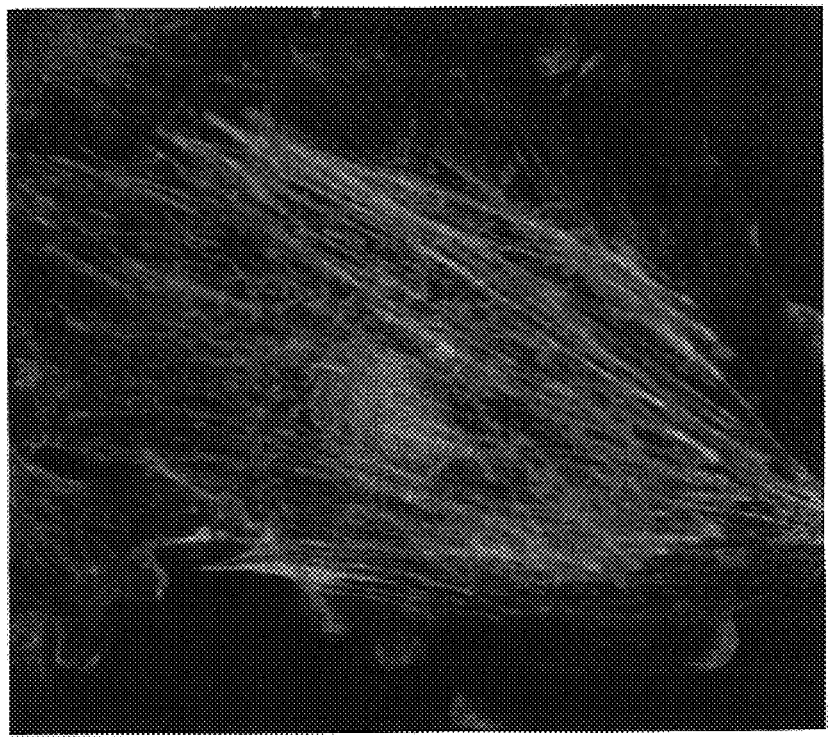
FIG. 15A shows a resulting image produced using a prior art illumination system of bovine pulmonary artery endothelial cells stained with three optical-interrogating labels and photographed three times, using a filter for each stain, with the resulting image being the three images overlaid on each other.
Figure 15B:
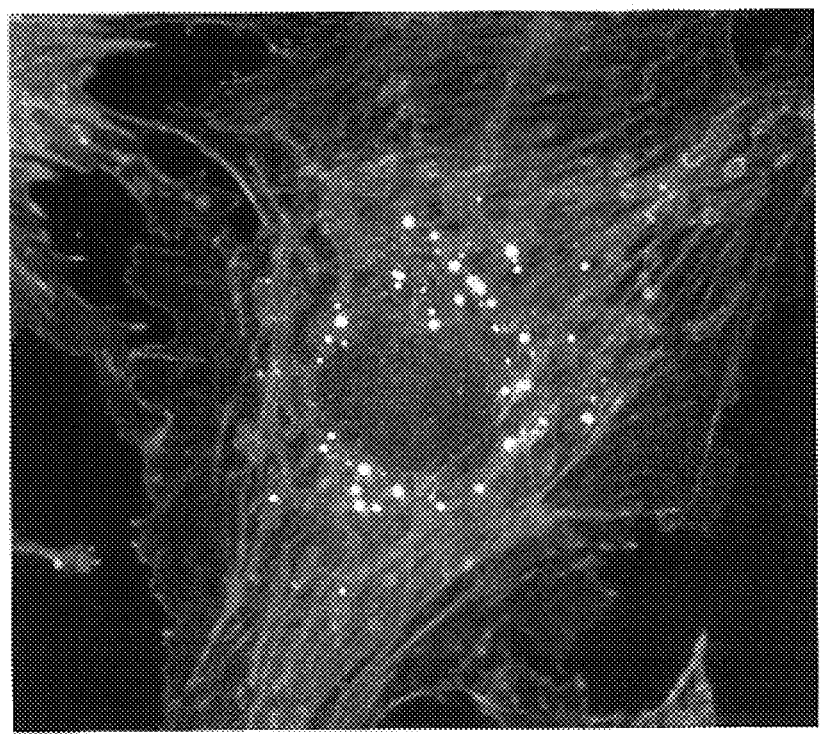
FIG. 15B shows the slide of FIG. 15A as imaged using an illumination system of the present invention, and showing the enhanced resolution.

Moreover, the system and method of the present invention are capable of producing a real time image recording through the use of multiple fluorescence labels (multiple colors) simultaneously (i.e., without requiring multiple exposures and without requiring different bandpass filters), which allows observing and recording multiple cellular and intracellular interactions. An example is seen more clearly in FIG. 15B. The image of FIG. 15B shows better resolution as compared to that of FIG. 15A (prior art). Notably, three different labels were applied to the sample. A FluoCells® prepared slide #1 showing bovine pulmonary artery endothelial cells was incubated with MitoTrakcer Red CMXRos to label the mitochondria. After fixation and permeabilization, the cells were stained with BODIPY FL phallacidin to label the F-actin filaments and finally counterstained with DAPI to label the nucleus. In FIG. 15A, a multiple-exposure image was acquired using separate bandpass filters appropriate for Texas Red dye, fluorescein and DAPI. In FIG. 15B, a single image showing better resolution was generated with an illumination device of the present invention and using no filters. As more fully discussed herein, the illumination device of the present invention allows live cells to be fluoresced and observed, as compared to previously known techniques, which are typically suitable for use only with dead or non-living cells.

Figure 16:
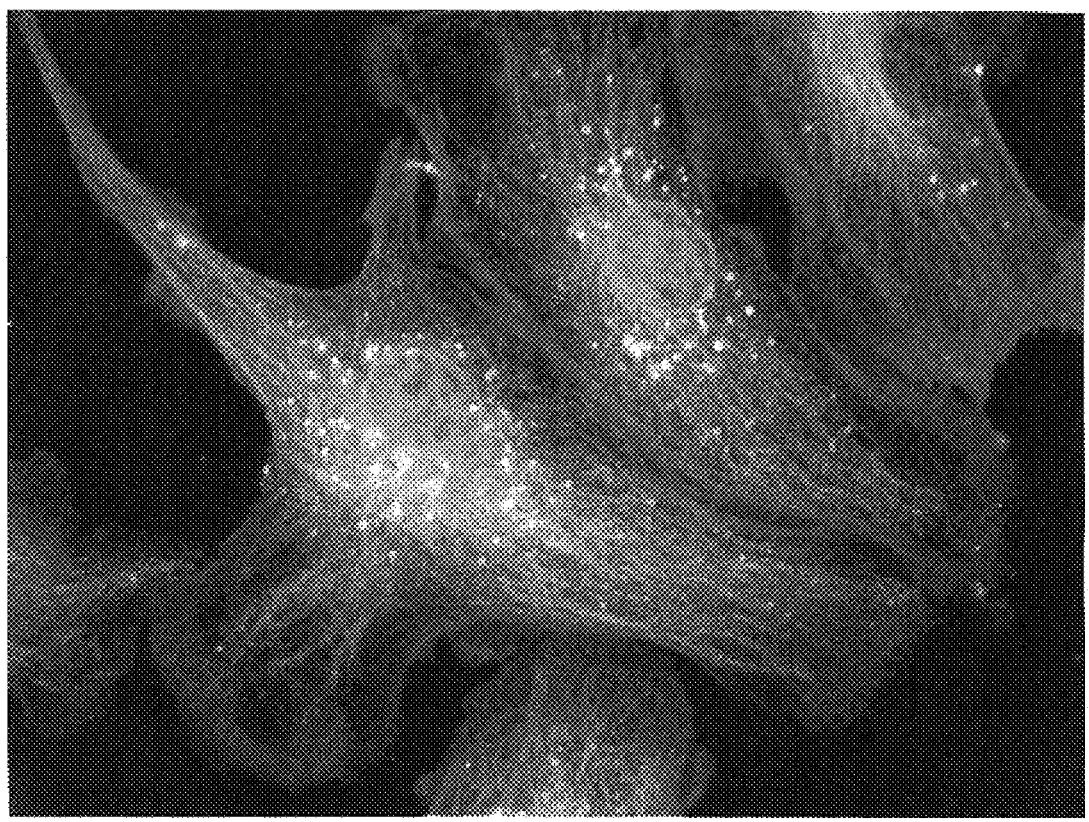
FIG. 16 shows an image of BPAE cells stained with red-fluorescent Texas Red phalloidin for labeling F-actin, mouse monoclonal anti-tubulin in conjunction with green-fluorescent BODIPY FL goat anti-mouse IgG for labeling microtubules and blue-fluorescent DAPI for labeling the nuclei.
Figure 17:
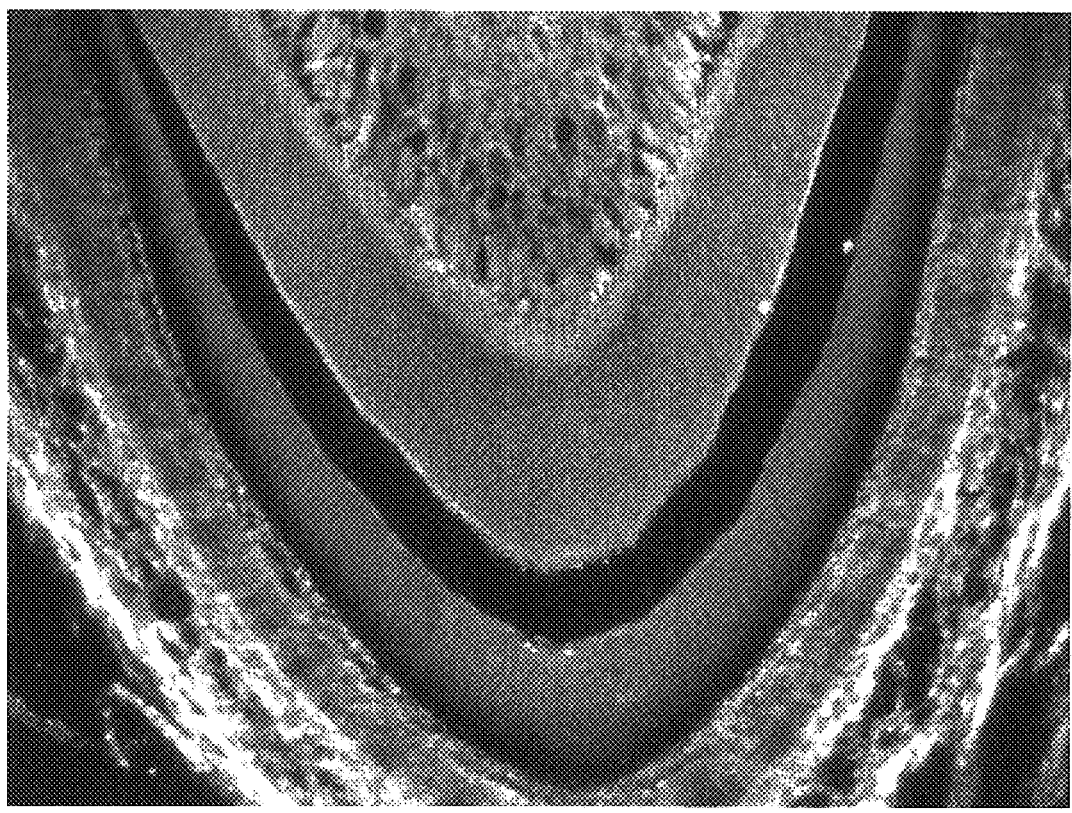
FIG. 17 shows an image of a developing primate tooth with H (hemoloxylin) and E (eosin) staining of paraffin imbedded tissues.

Additionally, molecular probes (antibodies or peptides that can bind to a specific protein, cell membrane, nucleolus, etc.) can be conjugated with the optically-interrogatable labels (nanoparticles, quantum dots, or dyes), and the complex can be introduced to a cell. When the complex binds the target molecule, the optically-interrogatable labels provide the additional contrast. Optionally, penetration enhancers, for example polyvinyl pyrrolidone (PVP) or dimethyl sulfoxide (DMSO) can be used in combination with the optically-interrogatable labels. Additional images produced by the illumination system of the present invention are shown in FIGS. 16 and 17. Additional advantages of the present method are described below.

Such fluorescence techniques in combination with the illumination device of the present invention can be useful in various clinical applications, such as for example the quick and accurate detection of sexually transmitted diseases, such as chlamydia. For example in an example method according to the present invention, a health care practitioner collects a urine sample from a patient. Fluorescein stained antibodies are applied to the urine sample, bind to the chlamydia bacteria, and fluoresce under the light of the microscope with the illumination device of the present invention, providing an indication of the presence or absence of chlamydia. It will be understood by those skilled in the art that the present invention can be applied to numerous other applications, including applications involving the quick and accurate detection of the presence of infective agents or pathogens in biological samples, within the scope of the present invention.

One notable advantage of the illumination device of the present invention, used in combination with fluorescence microscopy is that the spatial resolution and contrast of the observed image are enhanced through minimizing the spot size on the sample and by reduction of stray light. The spot can be positioned by moving the entire illumination device (not just the darkfield condenser) up and down towards or away from the specimen to be viewed, for example using a manual or electromechanical positional adjustment mechanism. Minimizing the spot size increases the irradiance (energy per unit area) of the sample and increases the contrast due to increased interaction with the smallest particles of the sample, which otherwise would not produce enough light to be visible. As illumination intensity is increased, the optical difference between small light scattering particles and their background increases. At still higher illumination, smaller particles scatter enough light to become visible. The particles can be seen even when their sizes are smaller than 50 nm. The movements of small protein aggregates (proteons) and olfactory cilia, both of which are smaller than 100 nanometers in diameter, which is too small to be seen in brightfield or DIC (differential interference contrast) illumination, can be observed and photographed by the system and method of the present invention. A high output numerical aperture of the illumination device allows using the full advantage of the high numerical aperture of the objective, thus producing highly luminous ultra resolution images.

Another notable advantage of the present system and method used in combination with fluorescence microscopy is that the metal halide lamp preferably used in example forms of the illumination device of the present invention generates a few strong spectral lines that can interact with a sample to produce special optical effects, as opposed to incandescent or halogen light sources that typically have continuous optical spectra. The illumination device of the present invention allows for a more efficient use of the light. Prominent peaks of intensity of the metal halide lamp occur at 313, 334, 365, 406, 435, 546, and 578 nanometers. The light exiting the illumination device passes through the sample, interacts with the molecules, and induces fluorescence. Because the illumination device of the present invention provides efficient illumination, almost all light from the light source is used to illuminate the sample, thereby efficiently conserving light energy. The geometry and high aperture of the condenser of example forms of the illumination device produce conditions for generation of standing evanescent waves, considerable enhancement of microscope resolution, and total internal reflection fluorescence (TIRF). Evanescent waves are formed when light is internally reflected off an interface at an angle greater than the critical angle (the critical angle is the angle of incidence for which the angle of refraction is 90 degrees) so that total internal reflection occurs. When sub micron-sized structures are located very close to the interface at which the evanescent wave is generated, it interacts with the structures and produces scattering and fluorescence. The selective excitation of fluorescence eliminates the out-of-focus light and reduces photobleaching, which typically occurs in conventional epi-fluorescence.

Unlike confocal microscopes, the present system achieves its three-dimensional sectioning by reducing its focal spot to a near-field volume so that wide-field real time detection can be achieved without scanning. It is generally accepted that TIRF phenomenon occurs only in very close proximity to the glass/sample interface, where light enters from a media with a high refractive index into a media with a low refractive index. In reality, the evanescent wave phenomenon is extended beyond the glass/water interface as long as there is a gradient in the refractive indices of two adjoining surfaces. Many internal cellular structures have a high refractive index compared to one of the intracellular fluids. The refractive index of cellular membrane is about 1.46, while the average index of the cytoplasm relative to saline is 1.02, and the cytoplasm index varies across the diameter of the cell, such that is 1.6-times larger in the center than at the edges. Thus light coming to the intracellular interfaces under total internal reflection angles also produces evanescent waves along these surfaces and generates fluorescence in structures that are in close proximity of these interfaces. The evanescent wave fluorescence together with a high output numerical aperture of the present system allows using a full advantage of high numerical aperture of objective and producing highly luminous ultra resolution and fluorescence images using a low wattage light, such as a 21 watt light source. Where there is a glass-metal interface, the system can create surface plasmons. Also, the system of the present invention creates conditions for standing wave total internal reflection fluorescence, via a cylinder of light at every angle.

The illumination device and method of the present invention, used in combination with a fluorescence techniques, also increases the sharpness and intensity of the resulting images. Fine focusing and positioning of the focal point at any depth within the sample allow the illumination device to position a focal point of illumination just below the upper surface of the sample, which is very close to objective. This prevents the emitted fluorescent light from having to pass through the entire thickness of the sample before reaching the objective. Thus, sharp and intense fluorescence images are obtained, as compared with the typically less sharp images of conventional microscopes.

The system and method of the present invention also advantageously eliminate the need for an excitation filter and a barrier filter, which are typically used with conventional fluorescence microscopes. Because the illumination device of the present invention produces a very efficient separation of incident light from light produced as result of an interaction of the incident light and the sample (scattering and fluorescence), the need for an excitation filter and barrier filter is eliminated. When filters are not used and fluorochromes are present in the sample, the images produced by a transmitted light microscope fitted with the illumination device of the present invention comprise a superposition of ultra resolution images that would have existed without fluorochromes with fluorescence images. Contrary to phase contrast microscopy, the present system provides a better resolution and has no image distortions. Images produced using the illumination device of the present invention are similar to Nomarski differential interference contrast (DIC) microscopy, but they do not require a prerequisite orientation, they have a better contrast and resolution, the user can visualize very small particles, and they are less expensive to obtain. Therefore, the use of simultaneous fluorescence viewing together with the illumination device's ultra resolution imaging is more favorable than the combination of fluorescence viewing with phase and DIC microcopies.

Accordingly, it can be seen that the illumination device of the present invention, used in combination with a method of fluorescence microscopy, surprisingly overcomes many problems of traditional darkfield transmitted fluorescence microscopy (dia-fluorescence microscopy).

In addition, the method of transmitted light fluorescence microscopy provided by a microscope system fitted with the illumination device of the present invention has notable advantages over brightfield reflected fluorescence microscopy (epi-fluorescence microscopy). The illumination device of the present invention typically provide at least four (4) times better light economy, so that a low wattage power supply can be used, such as a 21-watt power supply; as compared to the higher wattage of around 75-100 watts required for a typical epi-fluorescence microscope. The illumination device of the present invention does not require a dichroic mirror, and optionally also excludes excitation and barrier filters, thereby providing better efficiency. Because the transmission efficiency of the dichroic mirror of the conventional system is about 85% and that of the filters is about 80%, thus, the overall efficiency of the three elements is calculated to be about 54% (0.85×0.8×0.8=0.544) for traditional systems. Because the efficiency of the surface mirror 56 of the illumination device of the present invention is almost 100%, the transmission efficiency of the present invention is typically at least 46% better than that of a conventional epi-fluorescence microscope.

Another advantageous feature of the illumination device of the present invention is its inherently "cool" light. The illumination volume of the illumination device of the present invention can be defined by an empty light cone, compared with a solid cone illumination volume in typical epi-fluorescence microscopy. For example, for an empty cone of light with a range of numerical apertures from about 1.2 to about 1.4 and a refractive index 1.51, it is estimated that an illuminated volume is about 2.5 times smaller than with a solid cone of a numerical aperture 1.33. Thus, an approximately 2.5 times smaller sample volume is subjected to illumination and photobleaching, as compared to imaging produced by a standard epi-fluorescence microscope, based on the ratio of geometrical volumes of empty and solid cones.

Moreover, the system and method of the present invention enable simultaneous fluorescence viewing together with ultra resolution imaging. Thus, the present invention better enables observation of ultra small particles like quantum dots, which typically cannot be viewed by a brightfield epi-fluorescence microscope. The present invention does not require changing the filters for multicolor fluorescence, and the image can be recorded as a single "shot" (recording). This represents a vast improvement over previous systems wherein separate images are acquired using different bandpass filters appropriate for certain stains (colors), and then are overlayed to create a single image. With the present system and method, a single image can be taken in real-time because there is no need for filters. As such, the system and method of the present invention are capable of producing a real time image recording using multiple fluorescence labels (multiple colors), which allows observing and recording multiple cellular and intracellular interactions.

While the invention has been described with reference to preferred and example embodiments, it will be understood by those skilled in the art that a number of modifications, additions and deletions are within the scope of the invention, as defined by the following claims.

What is claimed is:

1. A stand-alone illumination device for a microscope comprising: at least one collimating lens for collimating light generated by a light source; a flat mirror for reflecting the collimated light; and a darkfield condenser for receiving the reflected light from the flat mirror and directing a hollow cone of light onto a sample under observation, wherein the stand-alone illumination device is removably attachable to any transmitted light microscope, at a condenser location of the microscope, as a single unit.

2. The stand-alone illumination device of claim 1, further comprising a beam director for directing light from the light source toward the darkfield condenser.

3. The stand-alone illumination device of claim 1, further comprising substantially rigid coupling means for maintaining alignment between the light source and the darkfield condenser.

4. The stand-alone illumination device of claim 1, wherein the light source is a metal-halide light source.

5. The stand-alone illumination device of claim 1, wherein the light source emits light having at least two different wavelengths.

6. The stand-alone illumination device of claim 1, wherein the at least one collimating lens comprises a plurality of collimating lenses for collimating the light from the light source.

7. The stand-alone illumination device of claim 1, further comprising a fitting for attachment to a transmitted light microscope.

8. The stand-alone illumination device of claim 1, wherein the darkfield condenser is a unitary component.

9. The stand-alone illumination device of claim 1, further comprising an adapter for enhancing efficiency of light transmission from the light source to the darkfield condenser, the adapter comprising a centrally disposed spacer and a plurality of optical fibers surrounding the spacer.

10. A system for microscopically observing a specimen, comprising:
    a transmitted light microscope; and
    a stand-alone illumination device for focusing light onto the specimen under observation by the microscope, comprising a collimating lens, a flat mirror and a darkfield condenser, wherein the stand-alone illumination device is removably attachable to any transmitted light microscope, at a condenser location of the microscope, as a single unit.

11. The system of claim 10, further comprising an adapter for enhancing economy of light transmission from a light source to the specimen, said adapter comprising a centrally disposed spacer and a plurality of optical fibers surrounding the spacer.

12. The system of claim 10, further comprising a camera for recording images of the specimen.

13. The system of claim 10, wherein the illumination device focuses a hollow cone of light onto the specimen.

14. A method of microscopically observing a specimen, the method comprising:
    coupling a removably attachable illumination device to a transmitted light microscope, at a condenser location of the microscope;
    focusing a hollow cone of light onto the specimen with a darkfield condenser of the illumination device; and
    transmitting light from a light source of the illumination device to the darkfield condenser, wherein the illumination device generates internal reflection of the light.

15. The method of claim 14, further comprising transmitting light through an adapter, the adapter comprising a plurality of optical fibers for receiving light from the light source and delivering a hollow cylinder of light to the darkfield condenser.

16. The method of claim 14, further comprising applying a fluorescence marker to the specimen, and viewing the sample under the microscope.

17. The method of claim 16, wherein viewing further comprises viewing a live specimen to observe cellular processes in real-time.

18. The method of claim 16, wherein focusing a hollow cone of light onto the specimen further comprises adjusting an angle of the cone of light to improve resolution.

19. The method of claim 18, wherein a focal spot size of the hollow cone of light focused on the specimen is reduced to a near-field volume.

20. The method of claim 14, wherein substantially all of the light transmitted to the illumination device is reflected internally within the illumination device.

21. The method of claim 20, wherein substantially all of the transmitted light from the light source illuminates the sample.

22. The method of claim 14, wherein the illumination device generates evanescent waves.

23. The method of claim 14, wherein the light transmitted into the illumination device is internally reflected off of an interface at an angle greater than a critical angle so that total internal reflection occurs.

24. The method of claim 14, wherein the darkfield condenser has an aperture of about 1.2 to about 1.4.

25. The method of claim 14, wherein the light source comprises a metal-halide light source.

26. A method of identifying pathogens, the method comprising coupling a stand-alone and portable illumination device to a transmitted light microscope, the illumination device comprising a darkfield condenser for focusing a hollow cone of light onto a specimen and a flat mirror for reflecting collimated light from a collimating lens to the darkfield condenser, wherein the illumination device is removably attachable to any microscope, at a condenser location of the microscope, as a single unit.

27. The method of claim 26, wherein the illumination device generates internal reflection of the light.

28. The method of claim 26, further comprising viewing a live specimen in real-time.

29. The method of claim 28, wherein a fluorescent marker is applied to the specimen for viewing emitted fluorescence.

30. An illumination device for a microscope comprising:
a collimating lens for collimating light generated by a light source;
a flat mirror for reflecting the collimated light;
a darkfield condenser for receiving collimated light and directing a hollow cone of light onto a sample under observation; and
an adapter for enhancing efficiency of light transmission from the light source to the darkfield condenser, wherein the illumination device is removably attachable to any transmitted light microscope, at a condenser location of the microscope, as a single unit.

31. The stand-alone illumination device of claim 30, wherein the adapter further includes a housing comprising a first coupling at an end thereof proximal a face of a centrally disposed spacer for connection to the darkfield condenser, and a second coupling at an opposite end thereof for connection to the light source.

32. The stand-alone illumination device of claim 30, wherein the adapter is integral with the illumination device.

33. The stand-alone illumination device of claim 30, wherein the adapter can be removably secured to the illumination device.

* * * * *